US011252472B2

(12) United States Patent
Cooper et al.

(10) Patent No.: US 11,252,472 B2
(45) Date of Patent: Feb. 15, 2022

(54) INVERTIBLE METERING APPARATUS AND RELATED METHODS

(71) Applicant: The Nielsen Company (US), LLC, New York, NY (US)

(72) Inventors: Timothy Scott Cooper, Oldsmar, FL (US); Saso Vranek, Ilirska Bistrica (SI); Andrej Barbis, Ilirska Bistrica (SI)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/039,508

(22) Filed: Sep. 30, 2020

(65) Prior Publication Data
US 2021/0021896 A1 Jan. 21, 2021

Related U.S. Application Data

(63) Continuation of application No. 16/192,394, filed on Nov. 15, 2018, now Pat. No. 10,834,460, which is a continuation of application No. 15/192,554, filed on Jun. 24, 2016, now Pat. No. 10,178,433.

(51) Int. Cl.
*H04N 21/442* (2011.01)
*H04N 21/2343* (2011.01)
*H04N 21/462* (2011.01)
*H04N 21/482* (2011.01)

(52) U.S. Cl.
CPC ... *H04N 21/4424* (2013.01); *H04N 21/23439* (2013.01); *H04N 21/44204* (2013.01); *H04N 21/44218* (2013.01); *H04N 21/4621* (2013.01); *H04N 21/4825* (2013.01)

(58) Field of Classification Search
None
See application file for complete search history.

(56) References Cited

U.S. PATENT DOCUMENTS

| 2004/0221754 | A1* | 11/2004 | Cochran | ............... B41F 15/34 |
| | | | | 101/127.1 |
| 2012/0081898 | A1* | 4/2012 | Cave | ................. F21V 15/01 |
| | | | | 362/249.01 |

* cited by examiner

*Primary Examiner* — Omar S Parra
(74) *Attorney, Agent, or Firm* — Hanley, Flight & Zimmerman, LLC

(57) ABSTRACT

Example invertible metering apparatus and related methods are disclosed. An example apparatus disclosed herein includes at least one processor and memory including instructions that, when executed, cause the at least one processor to at least: determine an orientation of a housing; determine if a housing is in a mounting orientation; in response to determining that the housing is not in the mounting orientation, initiate a first alarm; in response to determining that the housing is in the mounting orientation, determine an orientation of a stencil; determine if the stencil is in an upright orientation; in response to determining that stencil is not in the upright orientation, initiate a second alarm; and in response to at least one of the housing being in the mounting orientation or the stencil being in the upright orientation, assign a light pattern to a plurality of lights associated with the stencil.

24 Claims, 20 Drawing Sheets ic> # INVERTIBLE METERING APPARATUS AND RELATED METHODS

CROSS REFERENCE TO RELATED APPLICATIONS

This patent arises from a continuation of U.S. patent application Ser. No. 16/192,394, (Now U.S. Pat. No. 10,834,460) filed on Nov. 15, 2018, which is a continuation of U.S. patent application Ser. No. 15/192,554, filed on Jun. 24, 2016 (now U.S. Pat. No. 10,178,433). U.S. patent application Ser. No. 16/192,394 and U.S. patent application Ser. No. 15/192,554 are hereby incorporated herein by reference in their entireties. Priority to U.S. patent application Ser. No. 15/192,554 and U.S. patent application Ser. No. 15/192,554 is hereby claimed.

Additionally, this patent relates to subject matter disclosed in U.S. patent application Ser. No. 15/192,539, filed on Jun. 24, 2016, entitled invertible metering apparatus and related methods, U.S. patent application Ser. No. 16/518,499, filed on Jul. 22, 2019, entitled invertible metering apparatus and related methods, U.S. patent application Ser. No. 15/192,560, filed on Jun. 24, 2016, entitled meter apparatus and related methods, U.S. patent application Ser. No. 15/981,398, filed on May 16, 2018, entitled meter apparatus, and related methods, and U.S. patent application Ser. No. 16/418,690, filed on May 21, 2009 entitled meter apparatus and related methods. U.S. patent application Ser. No. 15/192,539, U.S. patent application Ser. No. 16/518,499, U.S. patent application Ser. No. 15/192,560, U.S. patent application Ser. No. 15/981,398, and U.S. patent application Ser. No. 16/418,690 are incorporated herein in their entireties.

FIELD OF DISCLOSURE

This patent is directed to metering devices and, more specifically, to invertible metering apparatus and related methods.

BACKGROUND

Monitoring companies monitor user interaction with media devices, such as smartphones, tablets, laptops, smart televisions, etc. To facilitate such monitoring, monitoring companies enlist panelists and install meters at the media presentation locations of those panelists. The meters monitor media presentations and transmit media monitoring information to a central facility of the monitoring company. Such media monitoring information enables the media monitoring companies to, among other things, monitor exposure to advertisements, determine advertisement effectiveness, determine user behavior, identify purchasing behavior associated with various demographics, etc.

BRIEF DESCRIPTION OF THE DRAWINGS

FIG. 1 illustrates the example meter in a first mounting orientation.

Figure 1:
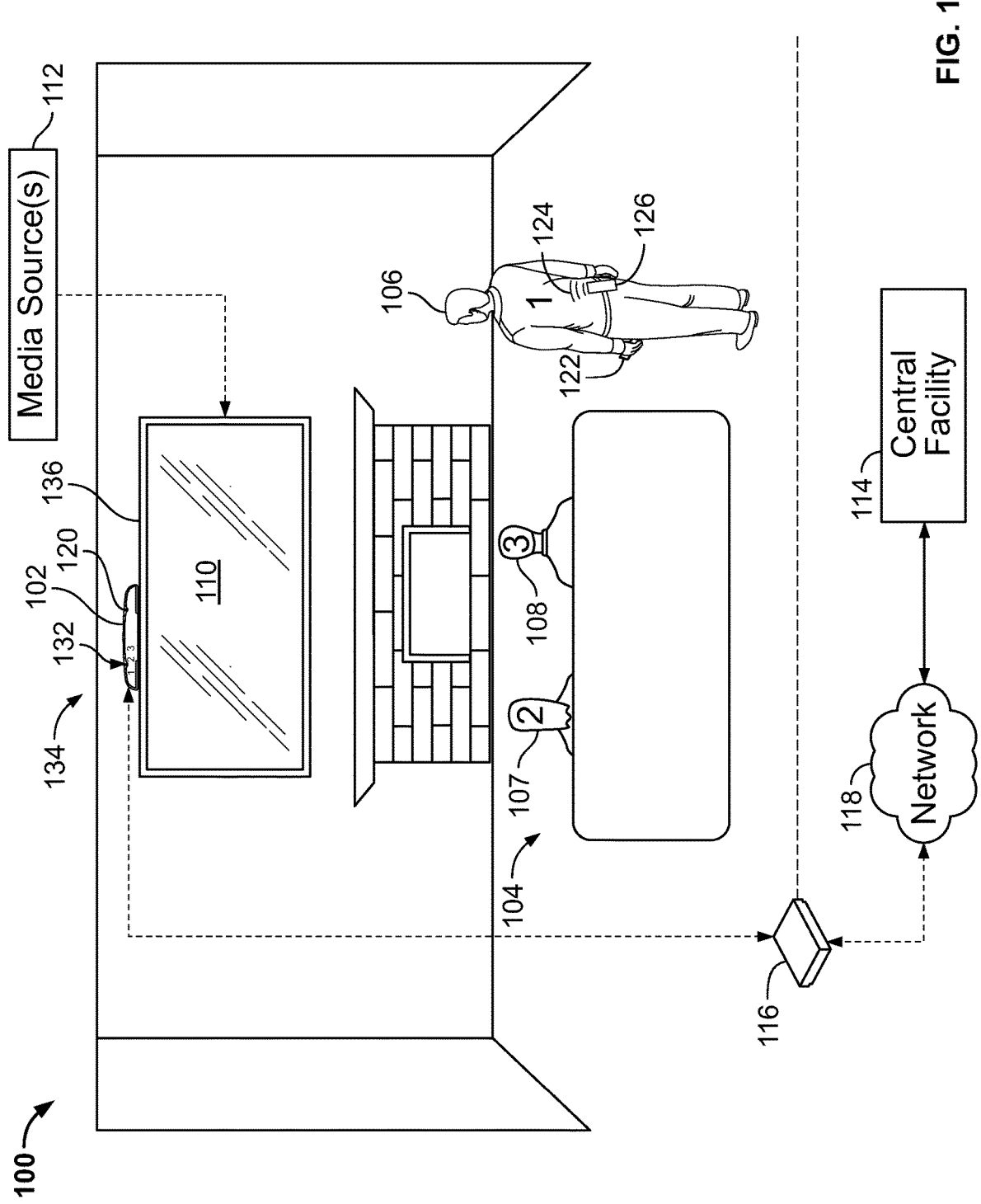
FIG. 1 illustrates an example audience measurement system having an example meter constructed in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact or directly engaged with another part means that there is no intermediate part between the two parts.

DETAILED DESCRIPTION

Audience measurement entities (also referred to herein as "ratings entities" or "monitoring companies") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets. For example, monitoring companies desire knowledge on how users interact with media devices, such as smartphones, tablets, laptops, smart televisions, etc. In particular, media monitoring companies monitor media presentations made at the media devices to, among other things, monitor exposure to advertisements, determine advertisement effectiveness, determine user behavior, identify purchasing behavior associated with various demographics, etc.

As used herein, the term "media" includes any type of content and/or advertisement delivered via any type of distribution medium. Thus, media includes television programming or advertisements, radio programming or advertisements, movies, web sites, streaming media, etc.

FIG. 1 is an illustration of an example audience measurement system 100 having an example meter 102 constructed in accordance with the teachings of this disclosure to monitor an example media presentation environment 104. In the illustrated example of FIG. 1, the media presentation environment 104 includes panelists 106, 107, and 108, an example media device 110 that receives media from an example media source 112, and the meter 102. The meter 102 identifies the media presented by the media device 110 and reports media monitoring information to an example central facility 114 of an audience measurement entity via an example gateway 116 and an example network 118. The example meter 102 of FIG. 1 sends media identification data and/or audience identification data to the central facility 114 periodically, a-periodically and/or upon request by the central facility 114.

In the illustrated example of FIG. 1, the media presentation environment 104 is a room of a household (e.g., a room in a home of a panelist, such as the home of a "Nielsen family") that has been statistically selected to develop media (e.g., television) ratings data for a population/demographic of interest. In the illustrated example of FIG. 1, the example panelists 106, 107 and 108 of the household have been statistically selected to develop media ratings data (e.g., television ratings data) for a population/demographic of interest. People become panelists via, for example, a user interface presented on a media device (e.g., via the media device 110, via a website, etc.). People become panelists in additional or alternative manners such as, for example, via a telephone interview, by completing an online survey, etc. Additionally or alternatively, people may be contacted and/ or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example, one or more panelists 106, 107 and 108 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 104 is a household in the illustrated example of FIG. 1, the example media presentation environment 104 can additionally or alternatively be any other type(s) of environments such as, for example, a theater, a restaurant, a tavern, a retail location, an arena, etc.

In the illustrated example of FIG. 1, the example media device 110 is a television. However, the example media device 110 can correspond to any type of audio, video and/or multimedia presentation device capable of presenting media audibly and/or visually. In some examples, the media device 110 (e.g., a television) may communicate audio to another media presentation device (e.g., an audio/video receiver) for output by one or more speakers (e.g., surround sound speakers, a sound bar, etc.). As another example, the media device 110 can correspond to a multimedia computer system, a personal digital assistant, a cellular/mobile smartphone, a radio, a home theater system, stored audio and/or video played back from a memory such as a digital video recorder or a digital versatile disc, a webpage, and/or any other communication device capable of presenting media to an audience (e.g., the panelists 106, 107 and 108).

The media source 112 may be any type of media provider(s), such as, but not limited to, a cable media service provider, a radio frequency (RF) media provider, an Internet based provider (e.g., IPTV), a satellite media service provider, etc. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc.

The example media device 110 of the illustrated example shown in FIG. 1 is a device that receives media from the media source 112 for presentation. In some examples, the media device 110 is capable of directly presenting media (e.g., via a display) while, in other examples, the media device 110 presents the media on separate media presentation equipment (e.g., speakers, a display, etc.). Thus, as used herein, "media devices" may or may not be able to present media without assistance from a second device. Media devices are typically consumer electronics. For example, the media device 110 of the illustrated example could be a personal computer, such as a laptop computer, and, thus, capable of directly presenting media (e.g., via an integrated and/or connected display and speakers). In some examples, the media device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media. While a television is shown in the illustrated example, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The example meter 102 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 114 via the gateway 116 and the network 118. While the media monitoring information is transmitted by electronic transmission in the illustrated example of FIG. 1, the media monitoring information may additionally or alternatively be transferred in any other manner, such as, for example, by physically mailing the meter 102, by physically mailing a memory of the meter 102, etc.

The meter 102 of the illustrated example of FIG. 1 combines audience measurement data and people metering data. For example, audience measurement data is determined by monitoring media output by the media device 110 and/or other media presentation device(s), and audience identification data (also referred to as demographic data, people monitoring data, etc.) is determined from people monitoring data provided to the meter 102. Thus, the example meter 102 provides dual functionality of a content measurement meter to collect content measurement data and people meter to collect and/or associate demographic information corresponding to the collected audience measurement data.

For example, the meter 102 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media device 110. To extract media identification data, the meter 102 and/or the example audience measurement system 100 extracts and/or processes the collected media identifying information and/or data received by the meter 102, which can be compared to reference data to perform source and/or content identification. Any other type(s) and/or number of media monitoring techniques can be supported by the meter 102.

Depending on the type(s) of metering the meter 102 is to perform, the meter 102 can be physically coupled to the media device 110 or may be configured to capture signals emitted externally by the media device 110 (e.g., free field audio) such that direct physical coupling to the media device 110 is not required. For example, the meter 102 of the illustrated example may employ non-invasive monitoring not involving any physical connection to the media device 110 (e.g., via Bluetooth® connection, WIFI® connection, acoustic watermarking, etc.) and/or invasive monitoring involving one or more physical connections to the media device 110 (e.g., via USB connection, a High Definition Media Interface (HDMI) connection, an Ethernet cable connection, etc.).

For example, the meter 102 of the illustrated example senses audio (e.g., acoustic signals or ambient audio) output (e.g., emitted) by the media device 110. For example, the meter 102 processes the signals obtained from the media device 110 to detect media and/or source identifying signals (e.g., audio watermarks) embedded in portion(s) (e.g., audio portions) of the media presented by the media device 110. To sense ambient audio output by the media device 110, the meter 102 of the illustrated example includes an example acoustic sensor 120 (e.g., a microphone). In some examples, the meter 102 may process audio signals obtained from the media device 110 via a direct cable connection to detect media and/or source identifying audio watermarks embedded in such audio signals. In some examples, the meter 102 may process audio signals and/or video signals to generate respective audio and/or video signatures from the media presented by the media device 110.

To generate exposure data for the media, identification(s) of media to which the audience is exposed are correlated with people data (e.g., presence information) collected by the meter 102. The meter 102 of the illustrated example collects inputs (e.g., audience identification data) representative of the identities of the audience member(s) (e.g., the panelists 106, 107 and 108). In some examples, the meter 102 collects audience identification data by periodically or aperiodically prompting audience members in the monitored media presentation environment 104 to identify themselves as present in the audience. In some examples, the meter 102 responds to predetermined events (e.g., when the media device 110 is turned on, a channel is changed, an infrared control signal is detected, etc.) by prompting the audience member(s) to self-identify. The audience identification data and the exposure data can then be complied with the demographic data collected from audience members such as, for example, the panelists 106, 107 and 108 during registration to develop metrics reflecting, for example, the demographic composition of the audience. The demographic data includes, for example, age, gender, income level, educational level, marital status, geographic location, race, etc., of the panelist.

In some examples, the meter 102 may be configured to receive panelist information via an example input device 122 such as, for example, a remote control, An Apple iPad®, a cell phone, etc.). In such examples, the meter 102 prompts the audience members to indicate their presence by pressing an appropriate input key on the input device 122. For example, the input device may enable the audience member(s) (e.g., the panelists 106, 107 and 108 of FIG. 1) and/or an unregistered user (e.g., a visitor to a panelist household) to input information to the meter 102 of FIG. 1. This information includes registration data to configure the meter 102 and/or demographic data to identify the audience member(s). For example, the input device 122 may include a gender input interface, an age input interface, and a panelist identification input interface, etc.

The meter 102 of the illustrated example may also determine times at which to prompt the audience members to enter information to the meter 102. In some examples, the meter 102 of FIG. 1 supports audio watermarking for people monitoring, which enables the meter 102 to detect the presence of a panelist-identifying metering device in the vicinity (e.g., in the media presentation environment 104) of the media device 110. In some examples, the acoustic sensor 120 of the meter 102 is able to sense example audio output 124 (e.g., emitted) by an example panelist-identifying metering device 126, such as, for example, a wristband, a cell phone, etc., that is uniquely associated with a particular panelist. The audio output 124 by the example panelist-identifying metering device 126 may include, for example, one or more audio watermarks to facilitate identification of the panelist-identifying metering device 126 and/or the panelist 106 associated with the panelist-identifying metering device 126.

The example gateway 116 of the illustrated example of FIG. 1 is a router that enables the meter 102 and/or other devices in the media presentation environment (e.g., the media device 110) to communicate with the network 118 (e.g., the Internet.).

In some examples, the example gateway 116 facilitates delivery of media from the media source 112 to the media device 110 via the Internet. In some examples, the example gateway 116 includes gateway functionality, such as modem capabilities. In some other examples, the example gateway 116 is implemented in two or more devices (e.g., a router, a modem, a switch, a firewall, etc.). The gateway 116 of the illustrated example may communicate with the network 118 via Ethernet, a digital subscriber line (DSL), a telephone line, a coaxial cable, a USB connection, a Bluetooth connection, any wireless connection, etc.

In some examples, the example gateway 116 hosts a Local Area Network (LAN) for the media presentation environment 104. In the illustrated example, the LAN is a wireless local area network (WLAN), and allows the meter 102, the media device 110, etc. to transmit and/or receive data via the Internet. Alternatively, the gateway 116 may be coupled to such a LAN. In some examples, the gateway 116 may be implemented with the example meter 102 disclosed herein. In some examples, the gateway 116 may not be provided. In some such examples, the meter 102 may communicate with the central facility 114 via cellular communication (e.g., the meter 102 may employ a built-in cellular modem).

The network 118 of the illustrated example is a wide area network (WAN) such as the Internet. However, in some examples, local networks may additionally or alternatively be used. Moreover, the example network 118 may be implemented using any type of public or private network, such as, but not limited to, the Internet, a telephone network, a local area network (LAN), a cable network, and/or a wireless network, or any combination thereof.

The central facility 114 of the illustrated example is implemented by one or more servers. The central facility 114 processes and stores data received from the meter 102. For example, the example central facility 114 of FIG. 1 combines audience identification data and program identification data from multiple households to generate aggregated media monitoring information. The central facility 114 generates reports for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 102 of the illustrated example provides a combination of media (e.g., content) metering and people metering. The example meter 102 of FIG. 1 is a stationary device disposed on or near the media device 110. The meter 102 of FIG. 1 includes its own housing, processor, memory and/or software to perform the desired audience measurement and/or people monitoring functions.

In examples disclosed herein, an audience measurement entity provides the meter 102 to the panelist 106, 107 and 108 (or household of panelists) such that the meter 102 may be installed by the panelist 106, 107 and 108 by simply powering the meter 102 and placing the meter 102 in the media presentation environment 104 and/or near the media device 110 (e.g., near a television set). In some examples, more complex installation activities may be performed such as, for example, affixing the meter 102 to the media device 110, electronically connecting the meter 102 to the media device 110, etc.

To identify and/or confirm the presence of a panelist present in the media device 110, the example meter 102 of the illustrated example includes an example display 132. For example, the display 132 provides identification of the panelists 106, 107, 108 present in the media presentation environment 104. For example, the meter 102 of the illustrated example displays indicia or visual indicators (e.g., illuminated numerals 1, 2 and 3) identifying and/or confirming the presence of the first panelist 106, the second panelist 107 and the third panelist 108.

The meter 102 of the illustrated example may be affixed to the media device 110 in any orientation such as, for example, above the media device 110, on a side of the media device 110, below the media device 110, etc. For example, the meter 102 of the illustrated example is capable of invertible mounting (e.g., with a primary orientation for above-television mounting and an inverted orientation for below-television mounting). In some examples, the example meter device 110 of the illustrated example may be capable of side-media device mounting (e.g., a left-side television mounting and a right-side television mounting). The different configurable orientations of the meter 102 enables flexibility when placing the meter 102 in different locations (e.g., on the media device 110, on a ceiling mounted television, a shelf, etc.) depending on footprint constraints of the media presentation environment 104 and/or the media device 110. To this end, the example meter 102 of the illustrated example provides a relatively small or narrow dimensional footprint (e.g., a relatively small thickness and/or height). Additionally, the orientation of the meter 102 may be configured at a manufacturing facility, a ratings company, in the field at the media presentation environment 104, and/or any other location.

To enable different mounting configurations of the example meter 102 disclosed herein, the example modular display 132 of the example meter 102 is modular. For example, the display 132 may be configured based on the mounting orientation of the meter 102. To enable presentation of indicia in an upright or right side up orientation via the display 132, the meter 102 of the illustrated example includes a removable stencil. For example, the stencil may be removed from the display 132 and may be re-oriented based on the mounting orientation of the meter 102. In some examples, an example stencil disclosed herein may be replaced or interchanged with a different stencil to present different indicia. For example, the display 132 of the illustrated example presents indicia having numerals. However, in some examples, the display 132 may be configured to present indicia having letters, text, symbols, and/or any other indicia and/or any combination thereof.

In addition, in some examples, the meter 102 of the illustrated example determines a proper orientation of the display 132 and/or the stencil. The display 132 and/or stencil of the illustrated example are properly oriented when the visual indicators of the display 132 are presented in an upright orientation. In other words, the display 132 and/or the stencil is in an improper orientation when the visual indicators presented by the display 132 and/or the stencil are, for example, inverted or upside-down.

In some examples, the meter 102 of the illustrated example controls a light operation associated with a respective one of the visual indicators of the display 132 and/or the stencil based on the detected orientation of the display 132 and/or the stencil. Thus, depending on a mounting orientation of the meter 102 and/or an orientation of the stencil, the meter 102 illuminates the proper visual indicator.

In the illustrated example of FIG. 1, the meter 102 is affixed or mounted to the media device 110 in a first mounting orientation 134. In the illustrated example, the first mounting orientation 134 provides an above-media device mounting configuration (e.g., an above-television mounting configuration), which places the display 132 in a landscape orientation relative to the media device 110. For example, the meter 102 is shown in a right-side up orientation in FIG. 1. The meter 102 of the illustrated example may be coupled (e.g., directly attached) to a surface 136 (e.g., an upper surface, an upper horizontal surface) of the media device 110. For example, the meter 102 of the illustrated example is in a substantially horizontal orientation relative to the media device 110 when the meter 102 is in the first mounting orientation 134. In the first mounting orientation 134, the display 132 of the illustrated example displays the visual indicators or indicia in an upright orientation. For example, the meter 102 of the illustrated example displays the visual indicators or indicia in a landscape configuration in ascending order from left to right in the orientation of FIG. 1. Alternatively, the meter 102 of the illustrated example may not be fixed to the media device 110. For example, the meter 102 may be placed in a location near the media device 110.

Figure 2:
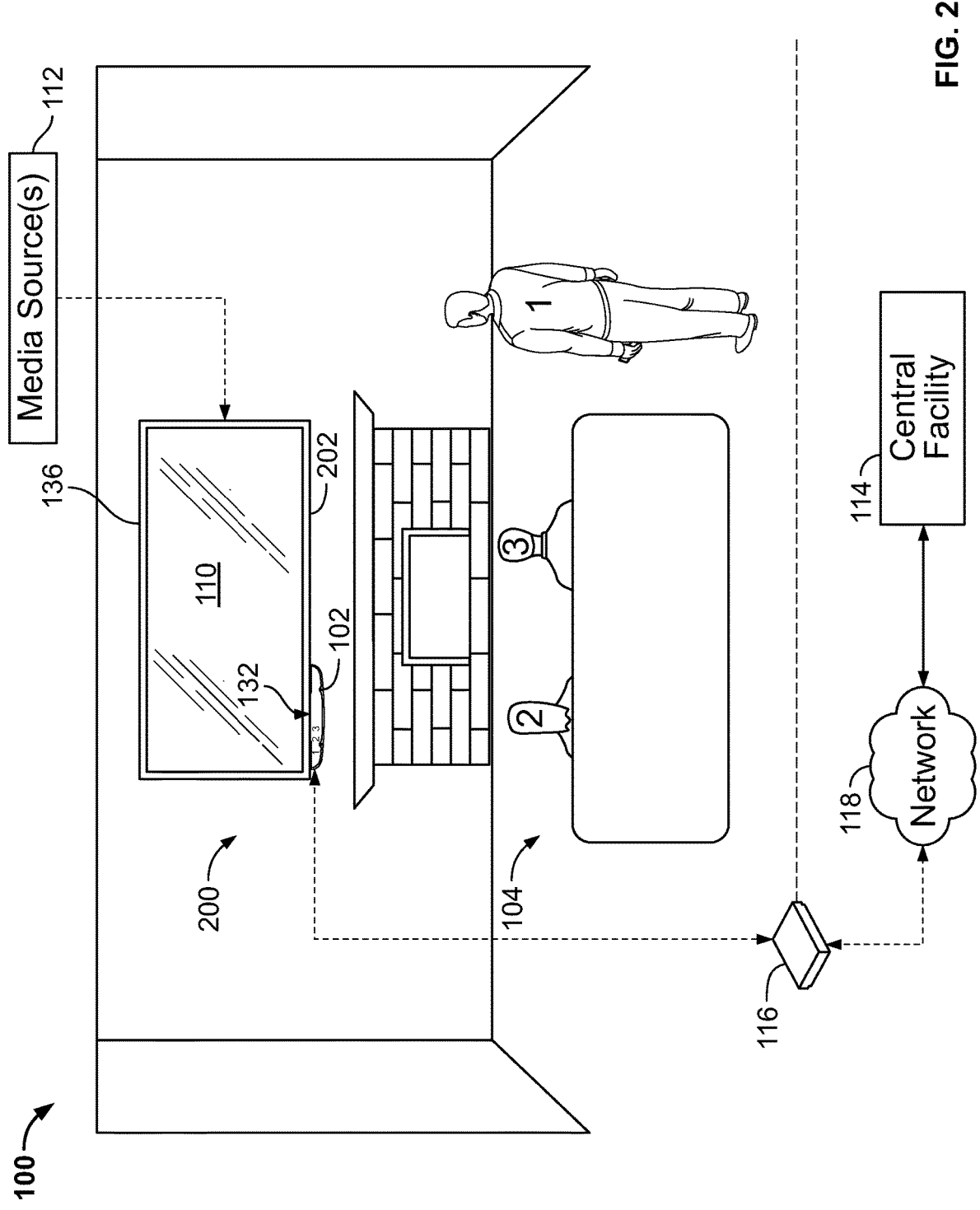
FIG. 2 illustrates the example audience measurement system of FIG. 1 with the example meter in a second mounting orientation.

FIG. 2 illustrates the example media presentation environment 104 of FIG. 1 with the meter 102 of the illustrated example in a second mounting orientation 200. In the second mounting orientation 200, the meter 102 of the illustrated example of FIG. 2 provides a below-media device mounting configuration (e.g., a below-television mounting configuration), which also places the display 132 in a landscape orientation relative to the media device 110. For example, the meter 102 of the illustrated example is in a substantially horizontal orientation relative to the media device 110 when the meter 102 is in the second mounting orientation 200. For example, the meter 102 shown in the illustrated example of FIG. 2 is inverted (e.g., upside down) relative to the orientation of the meter 102 shown in FIG. 1. The meter 102 of the illustrated example may be coupled (e.g., directly attached) to a surface 202 (e.g., a lower surface) of the media device 110 (e.g., that is opposite the mounting surface 136). Although the meter 102 provided in the second mounting orientation 200 is flipped upside down compared to the first mounting orientation 134 of FIG. 1, the display 132 of the example meter 102 displays the indicia in an upright orientation. In other words, although the meter 102 is turned upside down, the indicia presented by the display 132 is presented in an upright orientation. In the second mounting orientation 200, the display 132 of the illustrated example displays indicia in a landscape orientation in ascending order from left to right, similar to the orientation of FIG. 1.

Figure 3:
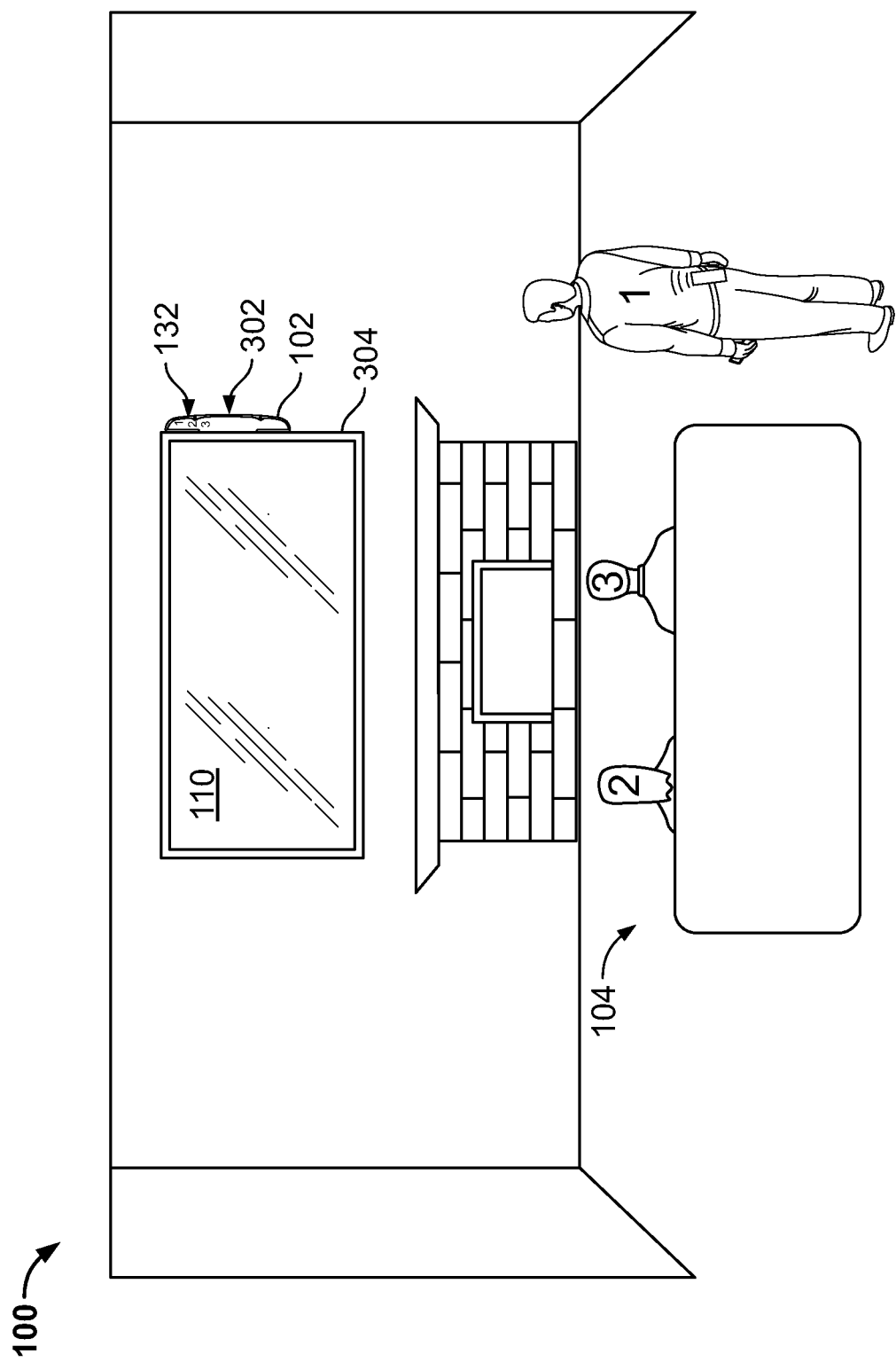
FIG. 3 illustrates the example audience measurement system of FIG. 1 with the example meter in a third mounting orientation or, alternatively, in a fourth mounting orientation.

FIG. 3 illustrates the example media presentation environment 104 of FIG. 1 with the example meter 102 of the illustrated example in a third mounting orientation 300 relative to the media device 110. In the third mounting orientation 300, the meter 102 of the illustrated example may be configured for a right-side media device mounting configuration, which places the display 132 in a portrait orientation relative to the media device 110. For example, the meter 102 of the illustrated example may be coupled (e.g. directly attached) to a surface 304 of the media device 110 (e.g., a vertical or right lateral surface in the orientation of FIG. 1).

Figure 4:
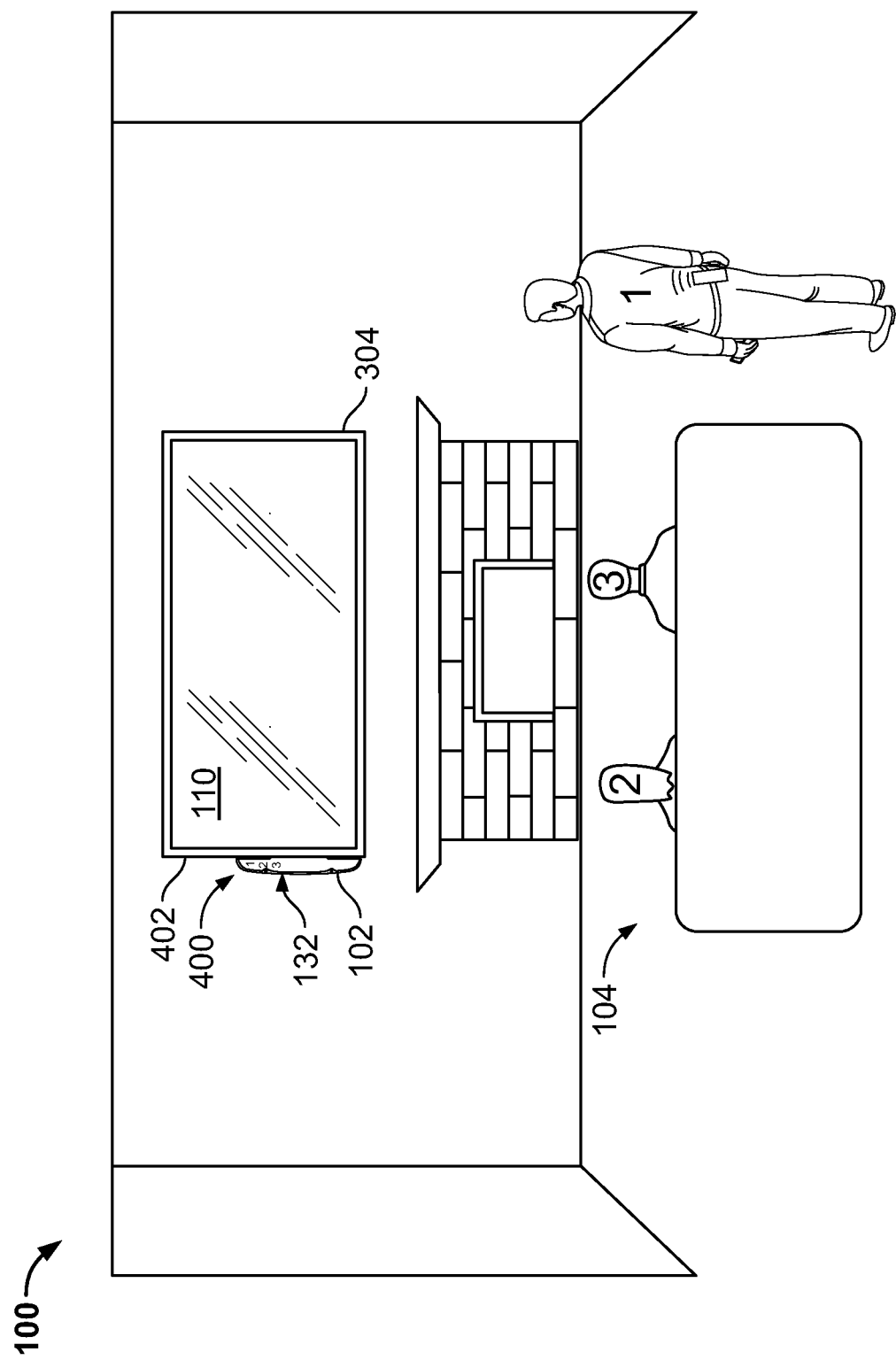
FIG. 4 illustrates the example audience measurement system of FIG. 1 with the example meter in another mounting orientation.

FIG. 4 illustrates the example media presentation environment 104 of FIG. 1 with the example meter 102 of the illustrated example in a fourth mounting orientation 400 relative to the media device 110. In the fourth mounting orientation 400, the meter 102 of the illustrated example may be configured for a left-side media device mounting configuration, which places the display 132 in a portrait orientation relative to the media device 110. For example, the meter 102 of the illustrated example may be coupled (e.g. directly attached) to a surface 402 of the media device 110 (e.g., a vertical or left lateral surface in the orientation of FIG. 1) opposite the surface 304.

In either of the third mounting orientation 300 or the fourth mounting orientation 400, the meter 102 of the illustrated example is in a substantially vertical orientation relative to the media device 110 (e.g., relative to horizontal). Additionally, the meter 102 of the illustrated example displays indicia in an upright orientation (e.g., a right side up orientation). In particular, the meter 102 of the illustrated example displays the indicia in a portrait configuration relative to the media device 110 when the meter 102 is positioned in the third mounting orientation 300 or the fourth mounting orientation 400. For example, the display 132 presents indicia (e.g., numerals 1, 2, and 3) in a portrait orientation in ascending order from top to bottom in the orientation of FIG. 3. By employing a modular display 132, a mounting orientation of the meter 102 of the illustrated example may be varied and the indicia presented by the display 132 is presented in a right side up or upright orientation (e.g., a top to bottom orientation).

Figure 5:
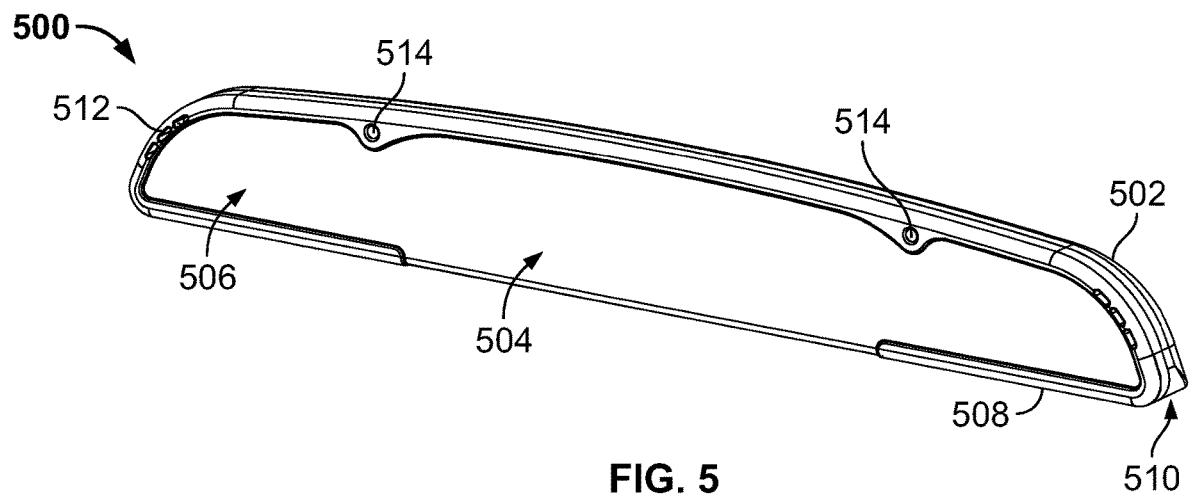
FIG. 5 is a perspective view of another example meter disclosed herein that may be sued to implement the example audience measurement system of FIG. 1.

FIG. 5 is a perspective, front view of an example meter 500 constructed in accordance with the teachings of this disclosure. The example meter 500 of FIG. 5 may implement the example meter 102 and/or the example audience measurement system 100 of FIGS. 1-4. The meter 500 of the illustrated example combines people metering and media (e.g., content) metering in a single example housing 502. To display panelist information, the meter 500 of the illustrated example includes an example display 504. The display 504 of the illustrated example is provided at a front side 506 of the meter 500. In particular, the display 504 of the illustrated example is a modular display. As described in greater detail below, the modular display 504 of the example meter 500 enables various or different mounting configurations or orientations, such as, for example, the mounting orientations 134, 200, 300 and 400 shown in FIGS. 1-4. In addition, regardless of the mounting orientation, the display 504 of the example meter 500 presents indicia or visual indicators in an upright or proper orientation.

To mount or couple the meter to a surface or edge of a media presentation device (e.g., the media device 110 of FIGS. 1-3), the meter 500 of the illustrated example includes an example mounting surface 508. The mounting surface 508 of the illustrated example is at a bottom side 510 of the example meter 500. For example, the bottom side 510 of the meter of the illustrated example is substantially perpendicular to the front side 506 of the meter 500. The meter 500 of the illustrated example includes an example opening 512 for audio output (e.g., via a speaker) and/or an example opening 514 to receive audio (e.g., via a microphone) generated by a media device (e.g., audio output of the example media device 110 of FIG. 1).

Figure 6:
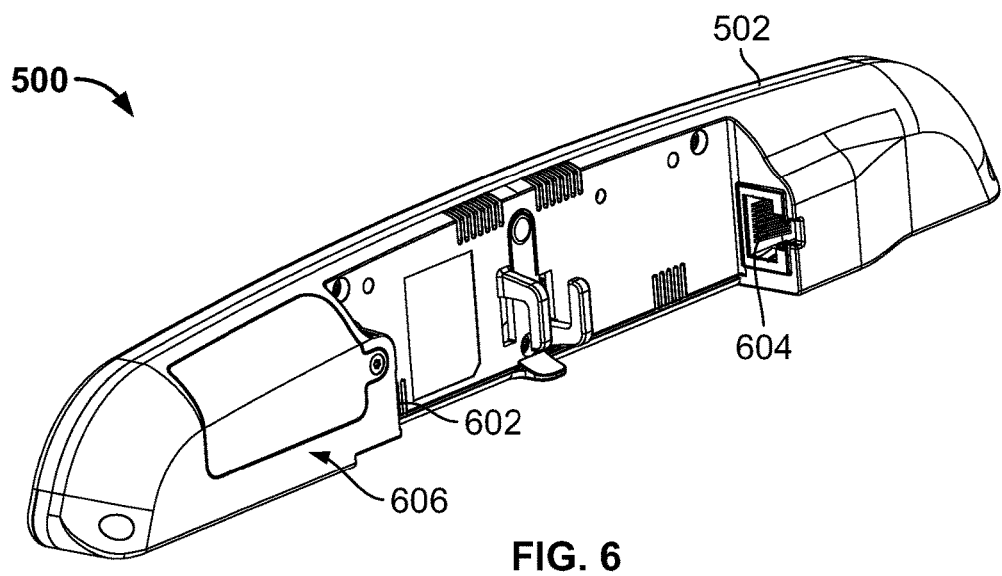
FIG. 6 is a perspective, rear view of the example meter of FIG. 5.

FIG. 6 is a perspective, rear view of the example meter of FIG. 5. The example meter 500 of the illustrated example employs an example first connector 602 and an example second connector 604 accessible via a rear side 606 of the housing 502. The first connector 602 and/or the second connector 604 of the illustrated example enables communication between, for example, the meter 500 and the media device 110 and/or the gateway 116 of FIGS. 1-4. The first connector 602 of the illustrated example is a USB connector and the second connector 604 of the illustrated example is an Ethernet connector (e.g., RJ45 jack, Cat5e connector, etc.). However, in some examples, the first connector 602 and/or the second connector 604 may be, for example, a power connector, a microUSB connector, coaxial cable connector, and/or any other type of connector(s).

Figure 7:
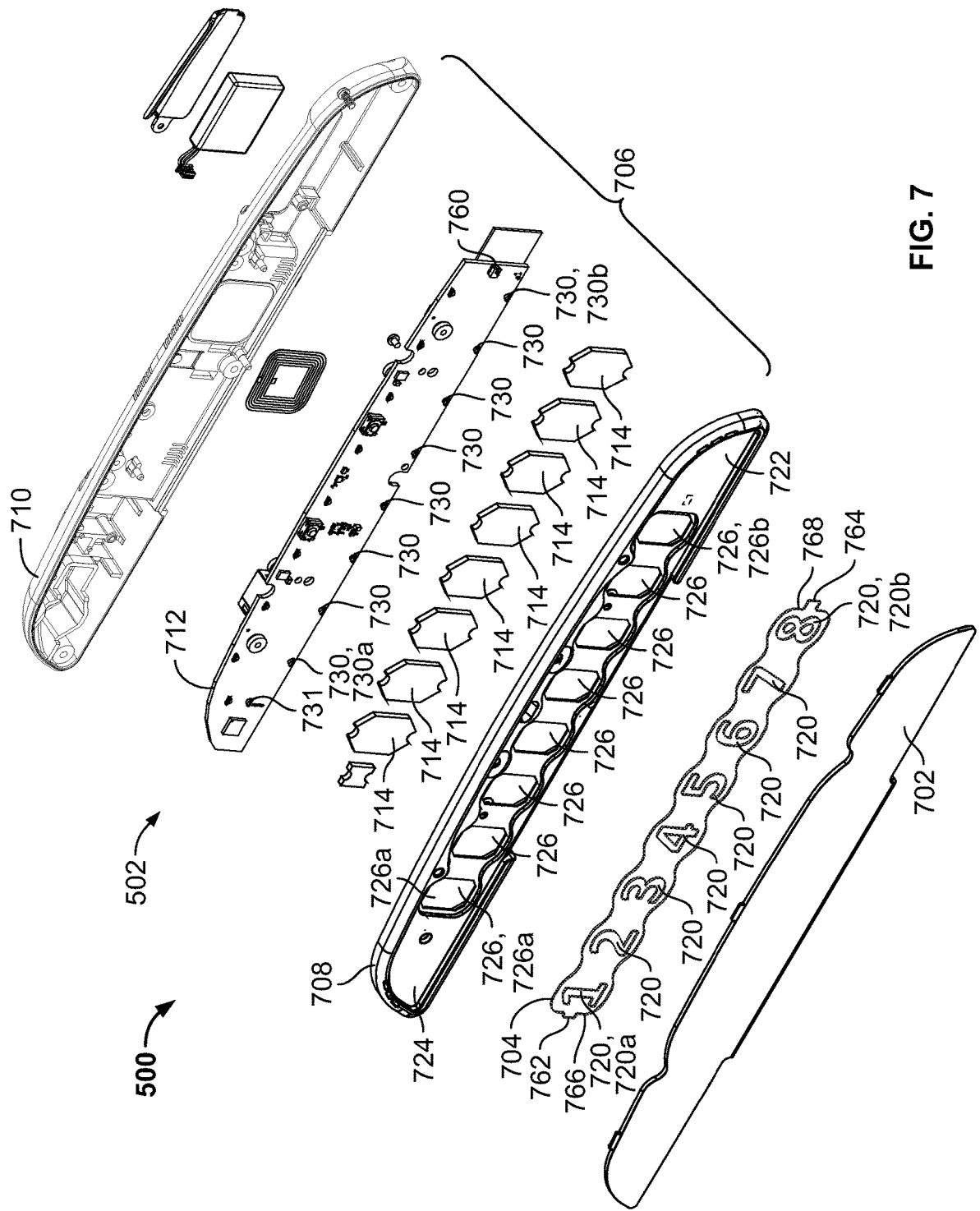
FIG. 7 is a perspective, exploded view of the example meter of FIGS. 5 and 6.

FIG. 7 is an exploded view of the example meter 500 of FIGS. 5 and 6. To provide the modular display 504, the meter 500 of the illustrated example includes an example cover 702 and an example stencil 704 that are removably coupled to an example first panel 708 of the housing 502. To house or capture example components 706 of the example meter 500, the housing 502 of the illustrated example includes a first panel 708 (e.g., a front housing portion) coupled to an example second panel 710 (e.g., a rear housing portion). The first panel 708 may be coupled to the second panel 710 via fasteners, snap fit connection, adhesive and/or any other fastening technique(s), fastener(s) and/or connector(s). The components 706 of the example meter 500 may include an example circuit board 712 (e.g. a printed circuit board) having a microprocessor, a plurality of example diffusors 714, etc. In some examples, the housing 502 (e.g., the first panel 708 and the second panel 710) is composed of one or more non-conductive materials, such as plastic, to reduce interference with one or more communication devices (e.g., antennas) of the example meter 500.

To display identification of a panelist registered with the meter 500, the meter 500 of the illustrated example employs the stencil 704. In particular, the stencil 704 of the illustrated example includes indicia having a plurality of example visual indicators 720. For example, each of the visual indicators 720 may be assigned to represent a particular panelist (e.g., the panelists 106, 107 and/or 108 of FIG. 1) associated with a viewing area (e.g., the media presentation environment 104 of FIG. 1). The visual indicators 720 of the illustrated example are numerals. For example, the visual indicators 720 of the illustrated example includes eight single digit characters—one through eight. In some examples, the meter 500 of the illustrated example may represent up to eight panelists. In some examples, the visual indicators 720 may be more than eight or less than eight. In addition, the visual indicators 720 of the illustrated example are in ascending order (e.g., from left to right in the orientation of FIG. 7). Further, the visual indicators 720 of the illustrated example are presented in a landscape orientation. In some examples, the visual indicators 720 or indicia may include letters, text, or alphanumeric characters. In some examples, the visual indicators 720 or indicia may include symbols, other language characters (e.g., Chinese characters or other logograms) and/or any other indicia such as, for example, indicia to identify a panelist.

To receive the stencil 704, the housing 502 of the illustrated example includes an example display area 722. More specifically, the display area 722 of the illustrated example is provided by a front surface 724 of the first panel 708. The display area 722 of the housing 502 of the illustrated example includes a plurality of example openings 726. In the illustrated example, a respective one of the openings 726 is associated with (e.g., aligned with) a respective one of the visual indicators 720. For example, a first visual indicator 720a (e.g., a first numeral or indicia) of the stencil 704 is aligned with a first opening 726a and a second visual indicator 720b (e.g., a second numeral or indicia) of the stencil 704 is aligned with a second opening 726b different from the first opening 726a. In the illustrated example, the housing 502 includes eight openings 726 associated with respective ones of the eight visual indicators 720 of the stencil 704.

Each of the openings 726 is in communication with a light source such as, for example, a light emitting diode that emits light when energized. The light source of the illustrated example includes a plurality of example lights 730 (e.g., light emitting diodes) that are surface mounted to the circuit board 712. A respective one of the lights 730 is aligned with a respective one of the openings 726 to illuminate a respective one of the visual indicators 720. The example circuit board 712 of the illustrated example includes eight lights 730. Thus, a first light 730a from the plurality of lights 730 illuminates the first visual indicator 720a from the plurality of visual indicators 720 via the first opening 726a, a second light 730b from the plurality of lights 730 illuminates the second visual indicator 720b from the plurality of visual indicators 720 via the second opening 726b, and so on. In this manner, a respective one of the lights 730 may illuminate a respective one of the visual indicators 720 of the stencil 704 aligned or associated with the respective one of the openings 726 in communication with the respective one of the lights 730. To evenly distribute or scatter light emitted by the lights 730 through the openings 726, the meter 500 of the illustrated example includes the example diffusors 714. A respective one of the diffusors 714 is positioned or aligned with a respective one of the openings 726.

The lights 730 may provide a clear (e.g., white) light, one or more colored lights (e.g., a green light, a red light, etc.), or any combination thereof. In some examples, an intensity of the lights 730 may vary (e.g., increase and/or decrease) when the meter 500 prompts a panelist to self-identify. For example, the meter 500 may cause the first light 730a to turn on and off rapidly to present the first visual indicator 720a in a flashing or blinking pattern for a duration of time (e.g., 20 seconds) or until a panelist self-identifies. In some examples, the lights 730 or a status indicator 731 may be illuminated to provide a visual warning or alarm, a status indication (e.g., a power indictor) and/or to convey any other information to a panelist.

In some examples, the meter 500 determines if the housing 502 is in an improper mounting configuration or orientation (e.g., an orientation other than the first mounting orientation 134 of FIG. 1, the second mounting orientation 200 of FIG. 2, the third mounting orientation 300 of FIG. 3, and/or the fourth mounting orientation 400 of FIG. 4).

To detect and/or verify proper orientation of the meter 500 and/or the housing 502 relative to a desired mounting configuration (e.g., the first mounting orientation 134 of FIG. 1, the second mounting orientation 200 of FIG. 2, the third mounting orientation 300, or the fourth mounting orientation 400 of FIG. 4), the meter 500 of the illustrated example employs an example orientation sensor (e.g., also referred as an orientation detector). For example, the orientation sensor of the meter 500 of the illustrated example is an accelerometer coupled to the circuit board 712 to sense an orientation of the meter 500 and/or the housing 502. In some examples, the orientation sensor may be a piezoelectric sensor, a strain gauge sensor, and/or any other sensor to detect an orientation of the meter 500 and/or the housing 502.

In some examples, the meter 500 detects the orientation of the housing 502 (e.g., with the orientation sensor) to determine if the housing 502 becomes dislodged or disconnected from the media device (e.g., the media device 110). For example, the meter 500 may be configured to determine the housing 502 may have fallen behind a television and/or from a mounting surface (e.g., the mounting surface 136) if the detected orientation of the housing 502 is not the first mounting orientation 134 of FIG. 1, the second mounting orientation of FIG. 2, the third mounting orientations 300 of FIG. 3, or the fourth mounting orientation 400 of FIG. 4. In some examples, the meter 500 of the illustrated example is configured to provide an alarm (e.g., a visual alarm via the display area 722 and/or an audible warning via a speaker) if the detected orientation is not a proper orientation (e.g., the detected orientation is neither the first mounting orientation 134 of FIG. 1, the second mounting orientation of FIG. 2, the third mounting orientations 300 of FIG. 4, or the fourth mounting orientation 400 of FIG. 4).

In some examples, the example meter 500 may control operation of the lights 730 based on a detected mounting orientation of the meter 500 and/or the housing 502. For example, the meter 500 may control a particular light 730 associated with a particular visual indicator 720 of the stencil 704 based on the detected orientation of the housing 502. For example, when the example meter 500 is in a first orientation (e.g., the first mounting orientation 134 of FIG. 1 or the third mounting orientation 300 of FIG. 3), the first light 730a is associated with the first visual indicator 720a of the stencil 704 and the second light 730b is associated with the second visual indicator 720b of the stencil 704. However, when the example meter 500 is in a second orientation (e.g., the second mounting orientation 200 of FIG. 2 or the fourth mounting orientation 400 of FIG. 4) (e.g., an inverted orientation)), the first light 730a is associated with the second visual indicator 720b of the stencil 704 and the second light 730b is associated with the first visual indicator 720a of the stencil 704 (i.e., the assignment or orientation of the lights 730 with the respective ones of the visual indicators 720 is flipped). Thus, the meter 500 may automatically assign the lights 730 with the respective one of the visual indicators 720 of the stencil 704 based on the orientation of the meter 500 and/or the housing 502.

In some examples, the meter 500 may verify that the stencil 704 is in a proper orientation relative to the housing 502. For example, the stencil 704 may be properly oriented relative to the housing 502 when the visual indicators 720 are oriented in an upright orientation or right-side up position. For example, the stencil 704 may need to be inverted when the housing 502 is repositioned from the first orientation (e.g., first mounting orientation 134 of FIG. 1) to a second orientation (e.g., the second mounting orientation 200 of FIG. 2). In some examples, the meter 500 may verify proper stencil orientation based on the detected orientation of the housing 502. For example, the meter 500 of the illustrated example verifies proper stencil orientation relative to the display area 722 based on the mounting orientation of the meter 500 and/or the housing 502.

To detect an orientation or position of the stencil 704 relative to the display area 722, the meter 500 of the illustrated example includes an example sensor 760 (e.g., a contact switch). To distinguish from the orientation sensor above, the sensor 760 is also referred to as the stencil sensor 760. To enable orientation detection of the stencil 704 via the sensor 760, the stencil 704 of the illustrated example includes one or both of a first example tab 762 and a second example tab 764. More specifically, the first tab 762 and the second tab 764 are asymmetric tabs protruding from respective lateral edges 766 and 768 of the stencil 704. The first tab 762 has a first dimension (e.g., a first length) and the second tab 764 has a second dimension (e.g., a second length) that is greater than the first dimension. However, in some examples, the stencil 704 may include only one tab and/or another feature to enable detection of an orientation of the stencil 704, for example, as described below.

In some examples, the example meter 500 may control operation of the lights 730 based on a detected orientation of the stencil 704. In some such examples, the example meter 500 may control operation of the lights 730 with or without detecting an orientation of the housing 502. For example, the meter 700 may control a particular light 730 associated with a particular visual indicator 720 of the stencil 704 based on the detected orientation of the stencil 704 alone, or in combination with the detected orientation of the housing 502. In some examples, when the example meter 500 detects that the sensor 760 is in a triggered or active state or condition (e.g., the second tab 764 is positioned in the sensing slot 800 when the stencil 704 is in the first orientation), the first light 730a is associated with the first visual indicator 720a of the stencil 704 and the second light 730b is associated with the second visual indicator 720b of the stencil 704. However, when the meter 600 detects that the sensor 760 is in a non-triggered or non-active state or condition (e.g., when the stencil 704 is in a second orientation (e.g., an inverted orientation) and the second tab 764 is in the slot 806), the first light 730a is associated with the second visual indicator 720b of the stencil 704 and the second light 730b is associated with the first visual indicator 720a of the stencil 704 (i.e., the assignment or orientation of the lights 730 with the respective ones of the visual indicators 720 is flipped). Thus, the meter 500 may automatically assign the lights 730 with the respective one of the visual indicators 720 of the stencil 704 based on a detected orientation of the stencil 704. In some examples, the meter 500 may control operation of the lights based on both the orientation of the housing 502 and the orientation of the stencil. In some examples, the operation of the stencil sensor 760 is not limited to the described examples but, for example, could be reversed (e.g., behavior associated with the sensor 760 being triggered could alternatively be associated with the sensor 760 not being triggered, and vice versa.

Figure 8:
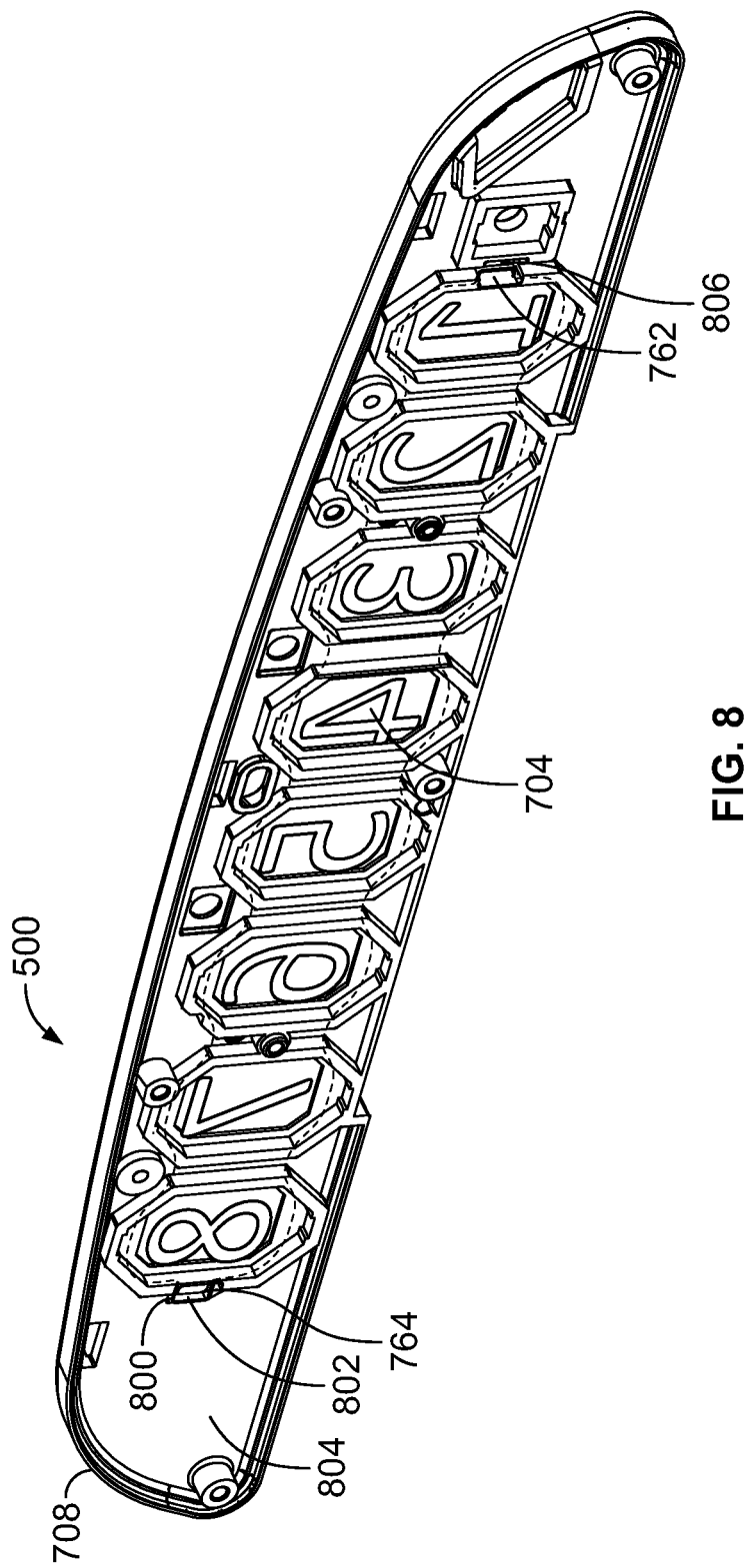
FIG. 8 is a perspective view of a first panel of the example meter of FIGS. 5-7.

FIG. 8 is a perspective view of the example first panel 708 of the example meter 500 of FIGS. 5-7. An outline of the stencil 704 is shown in FIG. 8 for illustrative purposes. For example, the stencil 704 is not positioned in contact with an inner surface 804 of the second panel 708. To enable the sensor 760 to detect the presence or absence of the first tab 762 or the second tab 764 of the stencil 704, the first panel 708 of the illustrated example includes an example sensing slot 800 (e.g., a recessed cavity, a channel, etc.). The sensing slot 800 may include a contact electrically coupled and/or mechanically coupled to the sensor 760. The sensing slot 800 of the illustrated example is a recessed channel 802 formed on an inner surface 804 of the first panel 708 opposite the display area 722. Thus, the sensing slot 800 of the illustrated example does not extend through the front surface 724 of the display area 722.

The sensing slot 800 of the illustrated example is sized to receive the first tab 762 and the second tab 764. However, the sensor 760 only detects the presence of the second tab 764 (e.g., due to the asymmetric dimensions of the first tab 762 and the second tab 764) when the first tab 762 and the second tab 764 are positioned in the sensing slot 800. For example, a contact may be positioned in the sensing slot 800 that may be triggered only by the second tab 764 positioned in the sensing slot 800. The first panel 708 of the illustrated example includes a slot 806 on a opposite end of the sensing slot 800 to receive the first tab 762 or the second tab 764 when the other one of the first tab 762 or the second tab 764 is positioned in the sensing slot 800. In some examples, the housing 502 may employ a contact switch and/or trigger in the slot 806 instead of the sensing slot 800. In some examples, the housing 502 may employ the stencil sensor 760 in communication with the sensing slot 800 and may employ an additional sensor in the slot 806 and/or along the perimeter of the display area 722 and/or a perimeter of the stencil 704. For example, the stencil 704 may include a third tab to interact with sensors positioned along the perimeter of the display area 722 to determine the orientation of the stencil 704.

Figure 9:
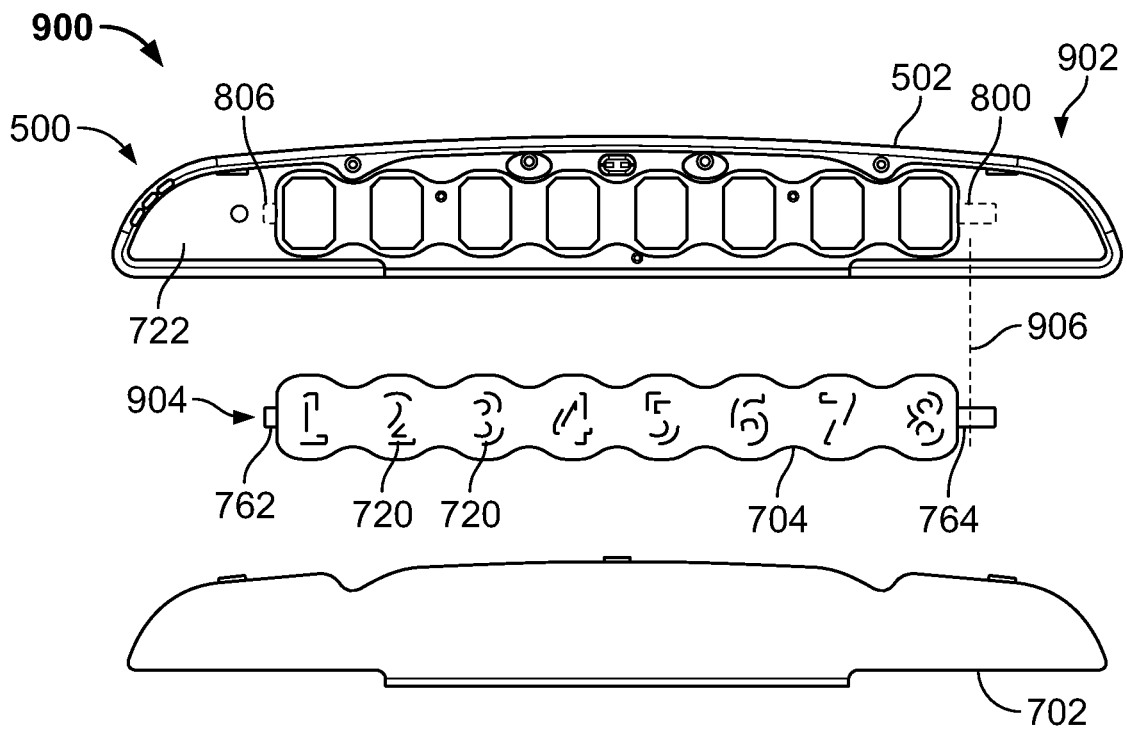
FIG. 9 illustrates the example meter of FIGS. 5-8 in a first orientation.

FIG. 9 illustrates the example meter 500 of the illustrated in a first example mounting configuration 900. In the first mounting configuration 900, the housing 502 of the illustrated example is in a first orientation 902 and the stencil 704 is in a first direction 904. The stencil 704 of the illustrated example is properly oriented relative to the display area 722 and/or the orientation of the housing 502 because the visual indicators 720 of the stencil 704 are presented in the display area 722 in an upright orientation. Additionally, when the housing 502 of the illustrated example is in the first orientation 902 and the stencil 704 is positioned in the display area 722 in the first direction 904, the sensor 760 detects the second tab 764 positioned in the sensing slot 800. For example, the sensor 760 senses the second tab 764 in the sensing slot 800 because the second tab 764, due to the length of the second tab 764, engages or activates a trigger 906 (e.g., represented by a dashed line in FIG. 9) of the sensor 760 (e.g., a contact switch positioned in the sensing slot 800). To this end, the meter 500 of the illustrated example determines or verifies that the stencil 704 is properly oriented relative to the housing 502 when the housing 502 is in the first orientation 902 (e.g., as determined with the orientation sensor described above) and the sensor 760 is in a triggered state or condition (e.g., the stencil 704 is in the first direction 904).

Figure 10:
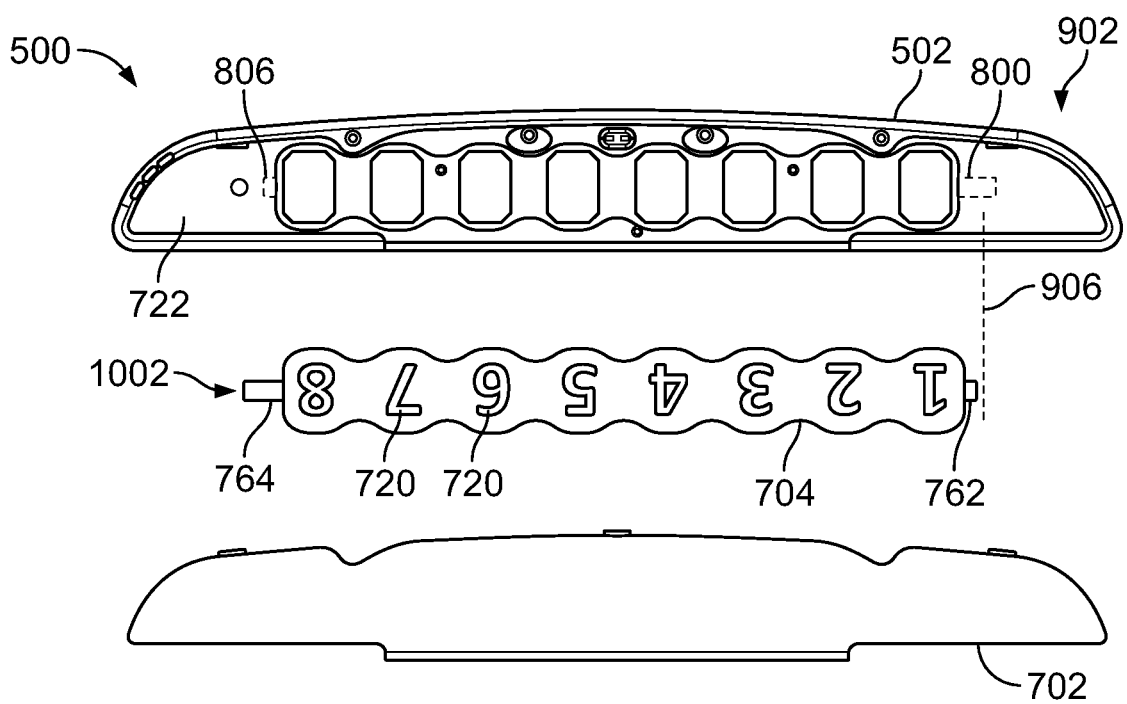
FIG. 10 illustrates the example meter of FIGS. 5-9 having an example stencil in an improper orientation.

FIG. 10 illustrates the example meter 600 of FIG. 9 with the example housing 502 in the first orientation 902 and the stencil 704 in a second direction 1002 (e.g., an upside-down orientation compared to the first direction 904). When the stencil 704 is in the second direction 1002, the second tab 764 is not positioned in the sensing slot 800. On the contrary, the first tab 762 of the stencil 704 is positioned in sensing slot 800 and the second tab 764 is positioned in the slot 806. The sensor 760 does not sense the first tab 762 in the sensing slot 800 because, due to the length of the first tab 762, the first tab 762 does not activate the trigger 906 of the sensor 760 (e.g., a contact switch positioned in the sensing slot 800). Thus, neither the first tab 762 nor the second tab 764 is sensed by the sensor 760 when the housing 502 is in the first orientation 902 and the stencil 704 is in the second direction 1002. In the second direction 1002, the visual indicators 720 of the stencil 704 are in an inverted or upside-down orientation compared to the orientation of the visual indicators 720 when the stencil 704 is in the first direction 904. To this end, the stencil 704 is improperly oriented relative to the display area 722 and/or the orientation of the housing 502 when the housing 502 is in the first orientation 902. Thus, the meter 500 of the illustrated example determines that the stencil 704 is not properly oriented when the meter 500 determines that the housing 502 is in the first orientation 902 (e.g., with the orientation sensor described above) and the sensor 760 is a non-triggered state or condition (e.g., the stencil 704 is in the second direction 1002). In some examples, the meter 500 of the illustrated example initiates an alarm (e.g., an audible alarm or a visual alarm) when the meter 500 determines the housing 502 is in the first orientation 902 and the stencil 704 is in the second direction 1002.

Figure 11:
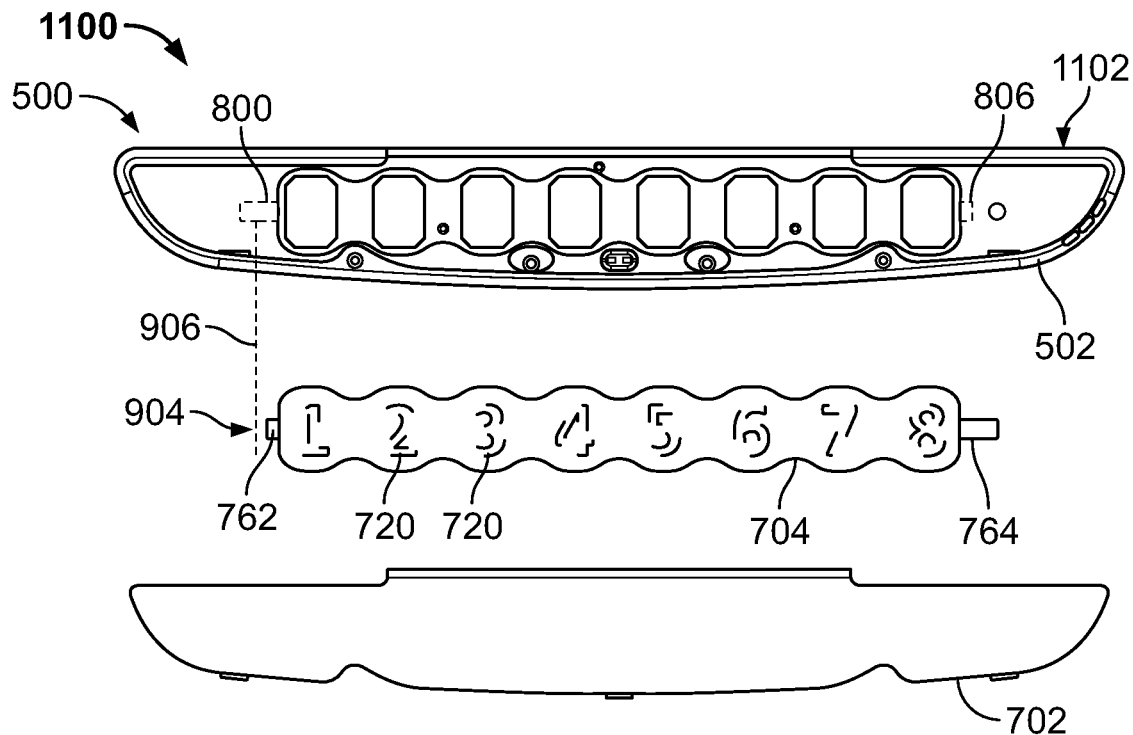
FIG. 11 illustrates the example meter of FIGS. 5-10 in a second orientation.

FIG. 11 illustrates the example meter 500 of the illustrated in a second mounting orientation 1100. In the second mounting orientation 1100, the housing 502 of the illustrated example is in a second orientation 1102 and the stencil 704 of the illustrated example in the first direction 904. For example, when the housing 502 is in the second orientation 1102, the sensor 760 and the sensing slot 800 will be positioned on a left side in the orientation of FIG. 11 (i.e., the housing 502 is inverted, flipped upside down, or rotated 180 degrees from the first orientation 902). Thus, when the housing 502 of the illustrated example is in the second orientation 1102 and the stencil 704 is positioned in the display area 722 in the first direction 904, the first tab 762 is positioned in the sensing slot 800 and the second tab 764 is positioned in the slot 806. Thus, the sensor 760 neither detects the second tab 764 nor the first tab 762 because the second tab 764 is in the slot 806 and the first tab 762 is in the sensing slot 800 does not engage or activate the trigger 906 of the sensor 760 (e.g., a contact switch positioned in the sensing slot 800). Although the housing 502 in the second orientation 1102 of the illustrated example is in an inverted orientation compared to the first orientation 902 of the housing 502, the stencil 704 positioned in the first direction 904 is properly oriented relative to the display area 722 and/or the orientation of the housing 502. In other words, the visual indicators 720 of the stencil 704 are presented in the display area 722 in an upright orientation even though the housing 502 is in the second orientation 1102 (e.g., an inverted orientation). Thus the meter 500 of the illustrated example determines that the stencil 704 is properly oriented relative to the display area 722 and/or the orientation of the housing 502 when the housing 502 is in the second orientation 1102 (e.g., as determined with the orientation sensor described above) and the sensor 760 is not triggered (e.g., the stencil 704 is in the first direction 904).

Figure 12:
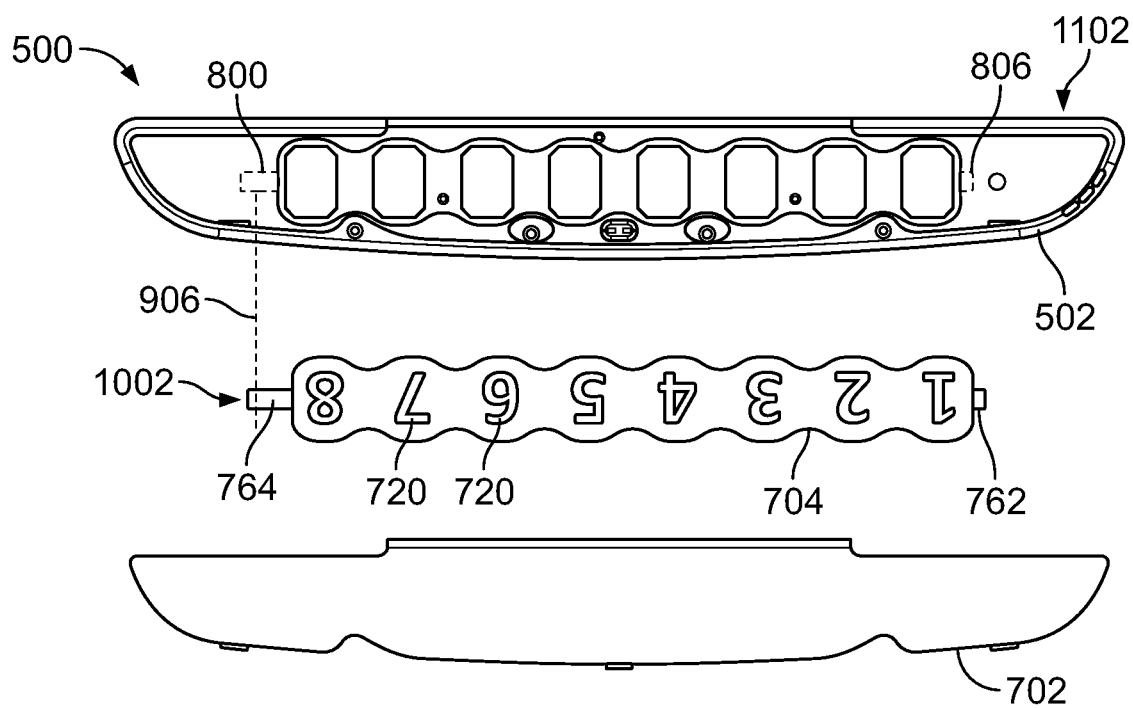
FIG. 12 illustrates the example meter of FIGS. 5-11 with the example stencil in an improper orientation.

FIG. 12 illustrates the example meter 500 with the example housing 502 in the second orientation 1102 and the stencil 704 in the second direction 1002. When the stencil 704 is in the second direction 1002, the second tab 764 is positioned in the sensing slot 800 and the first tab 762 of the stencil 704 is positioned in the slot 806. Thus, the second tab 764 in the sensing slot 800 triggers or activates the sensor 760. However, when the stencil 704 is in the second direction 1002, the visual indicators 720 of the stencil 704 are inverted or in an upside-down orientation compared to the orientation of the visual indicators 720 when the stencil 704 is in the first direction 904. To this end, the stencil 704 is improperly oriented relative to the display area 722 and/or the orientation of the housing 502. Thus the meter 500 of the illustrated example determines that the stencil 704 is improperly oriented relative to the display area 722 and/or the orientation of the housing 502 when the housing 502 is in the second orientation 1102 and the sensor 760 is in a triggered state or condition (e.g., the stencil 704 is in the second direction 1002). Additionally, the meter 500 of the illustrated example initiates an alarm (e.g., an audible alarm or a visual alarm) when the meter 500 determines the housing 502 is in the second orientation 1102 (e.g., as determined with the orientation sensor described above) and the sensor 760 is triggered (e.g., the stencil 704 is in the second direction 1002).

Figure 13:
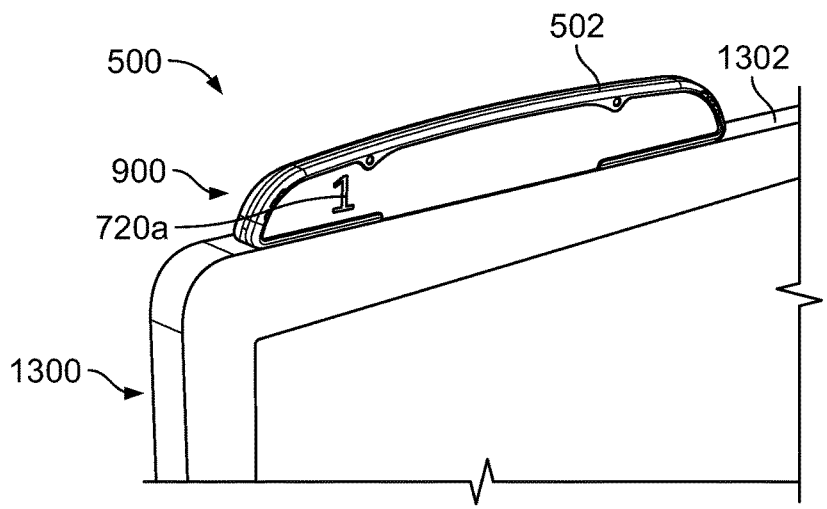
FIG. 13 illustrates the example meter of FIGS. 5-12 mounted to a media device in the first mounting orientation.

FIG. 13 illustrates the meter 500 of the illustrated example coupled to an example media device 1300 in the first mounting orientation 900 (e.g., an above-television mounting configuration, a horizontal orientation, etc.). In the first mounting orientation 900, the meter 500 is mounted to an upper surface 1302 of the media device 1300 in the orientation of FIG. 13. For example, in the first mounting orientation 900, the housing 502 is oriented in the first orientation 902 and the stencil 704 is oriented in the first direction 904 (e.g., an upright orientation). Thus, the lights 730 illuminate the respective visual indicators 720, the illuminated visual indicators 720 appear in an upright orientation. As shown in FIG. 13, the first visual indicator 720a is illuminated to identify that a panelist (e.g., the panelist 106 of FIG. 1) assigned to the first visual indicator 720a is present in a media presentation environment. To this end, the meter 500 (e.g., via a processor, a logic circuit, etc.) causes the first light 730a (FIG. 7) to illuminate the first visual indicator 704a when the meter 500 is determined to be in the first mounting orientation 900 (e.g., using the orientation sensor described above and/or the stencil 704 is determined to be in the first direction 904 (e.g., using the stencil sensor 760)). In addition, the cover 702 is semi-translucent to allow visual presentation of only the illuminated visual indicators 720 (e.g., the first visual indicator 720a of the illustrated example of FIG. 13) at the display 504.

Figure 14:
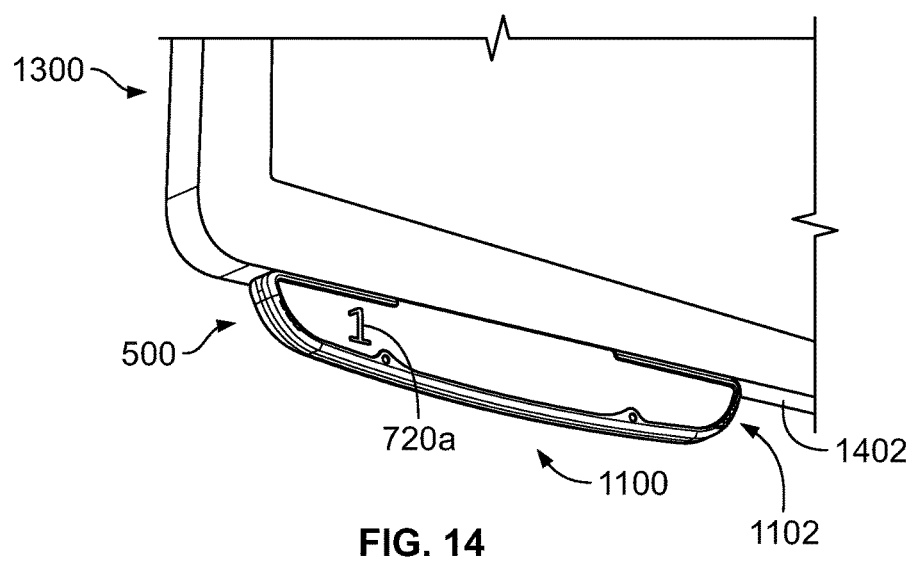
FIG. 14 illustrates the example meter of FIGS. 5-13 mounted to the media device in the second mounting orientation.
Figure 16:
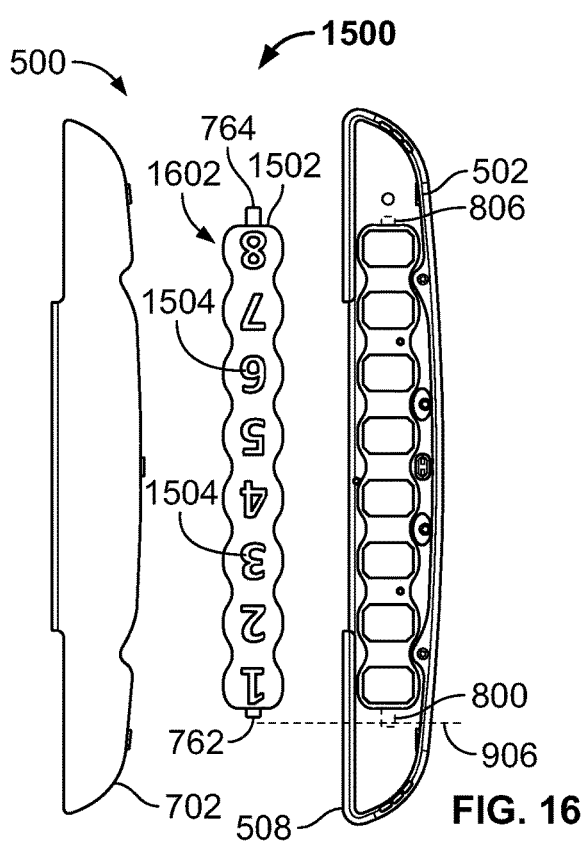
FIG. 16 illustrates the example meter of FIG. 15 having an example stencil in an improper orientation.

FIG. 14 illustrates the meter 500 of the illustrated example coupled to the example media device 1300 in the second mounting orientation 1100 (e.g., a below-television mounting configuration, a horizontal orientation). In the second mounting orientation 1100, the meter 500 is mounted to a lower surface 1402 of the media device 1300 in the orientation of FIG. 14. For example, in the second mounting orientation 1100, the housing 502 is oriented in the second orientation 1102 and the stencil 704 is oriented in the first direction 904 (e.g., an upright orientation). For example, the visual indicators 720 of the stencil 704 are in an upright orientation (e.g., similar to the orientation of FIG. 11). In this manner, when the lights 730 illuminates the respective the visual indicators 720, the illuminated visual indicators appear in an upright orientation while the housing 502 (e.g., and the cover 702) is in the second orientation 1102 (e.g., an upside down orientation). As shown in FIG. 16, the first visual indicator 720a is illuminated to identify that a panelist (e.g., the panelist 106 of FIG. 1) assigned to the first visual indicator 720a is present in a media presentation environment. Thus, although the housing 502 is in the second orientation 1102 (e.g., an upside down orientation), the first visual indicator 720a is displayed in the upright orientation. Additionally, the meter 500 (e.g., via a processor, a logic circuit, etc.) causes the second light 730b (FIG. 9) to illuminate the first visual indicator 720a when the meter 500 is determined to be in the second mounting orientation 1100 (e.g., using the orientation sensor described above and/or the stencil 704 is determined to be in the first direction 904 (e.g., using the stencil sensor 760)).

Figure 15:
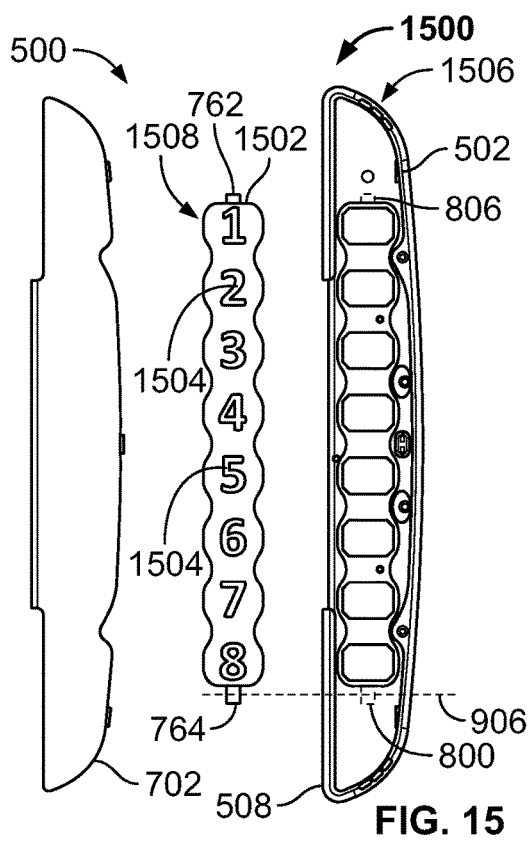
FIG. 15 illustrates the example meter of FIGS. 5 and 6 in a third orientation.

FIG. 15 illustrates the example meter 500 disclosed herein configured in a third example mounting orientation 1500. In addition, the mounting surface 508 of the housing 502 is oriented in a leftward orientation in the orientation of FIG. 15. To configure the meter 500 for mounting in the third mounting orientation 1500, the example meter 500 employs a stencil 1502. In some examples, the stencil 1502 of the illustrated example is interchangeable with the stencil 704 to configure the meter 500 for mounting in the third mounting orientation 1500.

The stencil 1502 of the illustrated example has the same or similar dimensional profile as the stencil 704. For example, a dimensional length and/or a perimeter shape of the stencil 1502 of the illustrated example is substantially similar to a dimensional length and/or a perimeter shape of the stencil 704. For example, the stencil 1502 of the illustrated example includes the tabs 762 and 764. Thus, the display 504 of the meter 500 and/or the display area 722 of the example housing 502 of the illustrated example provides a modular display to enable interchangeability between different stencils such as, for example, the stencil 1502 and the stencil 704. In the illustrated example, the stencil 1502 includes visual indicators 1504 (e.g., indicia). In particular, the visual indicators 1504 are numerals presented in a portrait orientation to enable mounting the meter 500 to side surfaces (e.g., vertical surfaces) of the media device 1300. Thus, unlike the stencil 704, which presents the visual indicators 720 in a landscape orientation, the example stencil 1502 of the illustrated example presents the visual indicators 1504 in the portrait orientation. In some examples, the visual indicators 1504 may have, for example, alpha characters, alphanumeric characters, symbols, and/or any other indicia.

In the example of FIG. 15, the cover 702 and the stencil 1502 of the illustrated example are shown removed from the housing 502 for illustrative purposes. In the third mounting orientation 1500, the housing 502 of the illustrated example is shown in a third orientation 1506 and the stencil 1502 is shown in a first orientation or a third direction 1508. In the third direction 1508, the visual indicators 1504 of the stencil 1502 are oriented in an upright orientation. Thus, the stencil 1502 is properly oriented relative to the display area 722 and/or the orientation of the housing 502 when the housing 502 is in the third orientation 1506 and the stencil 1502 is in the third direction 1508. For example, in the third mounting orientation 1500, the first tab 762 of the stencil 1502 of the illustrated example is positioned in the slot 806 and the second tab 764 is positioned in the sensing slot 800, which is detectable by the sensor 760.

FIG. 16 illustrates the example stencil 1502 in a fourth direction 1602 (e.g., in an opposite or inverted direction relative to the third direction 1508). In the fourth direction 1602, the visual indicators 1504 appear in an inverted or upside-down orientation when the housing 502 is in the third orientation 1506. When the stencil 1502 is in the fourth direction 1602 and the housing 502 is in the third orientation 1506, the first tab 762 is positioned in the sensing slot 800 and the second tab 764 is in the slot 806. Thus, the meter 500 of the illustrated example determines that the stencil 1502 is properly oriented when the housing 502 is detected in the third orientation 1506 and the sensor 760 is in a triggered state or condition (e.g., the stencil 1502 is in the third direction 1508). Alternatively, the meter 500 of the illustrated example determines stencil 1502 is improperly oriented when the sensor 760 is in a non-triggered state or condition when the housing 502 is in the third orientation 1506 (i.e., when the stencil 1502 is in the fourth direction 1602). In some example, the meter 500 emits an alarm to provide notification that the stencil 1502 is improperly oriented relative to the housing 502.

Figure 17:
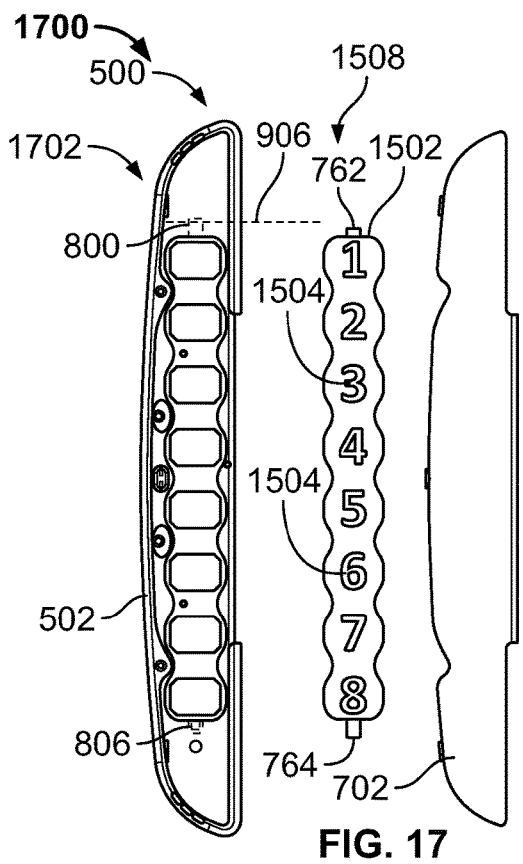
FIG. 17 illustrates the example meter of FIGS. 15-16 in a second orientation.

FIG. 17 illustrates the meter 500 of the illustrated example of FIG. 17 oriented in a fourth example mounting orientation 1700. In the illustrated example, the cover 702 and the stencil 1502 are removed from the housing 502 for illustrative purposes. In the illustrated example of FIG. 17, the housing 502 of the illustrated example is shown in a fourth orientation 1702 and the stencil 1502 is positioned in the third direction 1508 (e.g., the upright orientation). For example, the visual indicators 1504 of the stencil 1502 of the illustrated example are shown in an upright orientation (e.g., similar to the orientation of FIG. 15). The stencil 1502 may be coupled to the display area 722 of the housing 502 in the third direction 1508 while the housing 502 is in the fourth orientation 1702. In this manner, when the lights 730 illuminate the respective visual indicators 1504, the illuminated visual indicators 1504 appear in an upright orientation even though the housing 502 is in the fourth orientation 1702. In the illustrated example of FIG. 17, the first tab 762 of the stencil 1502 is positioned in the sensing slot 800 and the second tab 764 is positioned in the slot 806. As a result, the sensor 760 is in a non-triggered state or condition when the housing 502 is in the fourth orientation 1702 and the stencil 1502 is in the third direction 1508. Thus, the meter 500 of the illustrated example determines that the stencil 1502 is in the proper orientation relative to the housing 502 when the housing 502 is in the fourth orientation 1702 and the sensor 760 is in a non-triggered or condition (e.g., the stencil 1502 is in the third direction 1508).

Figure 18:
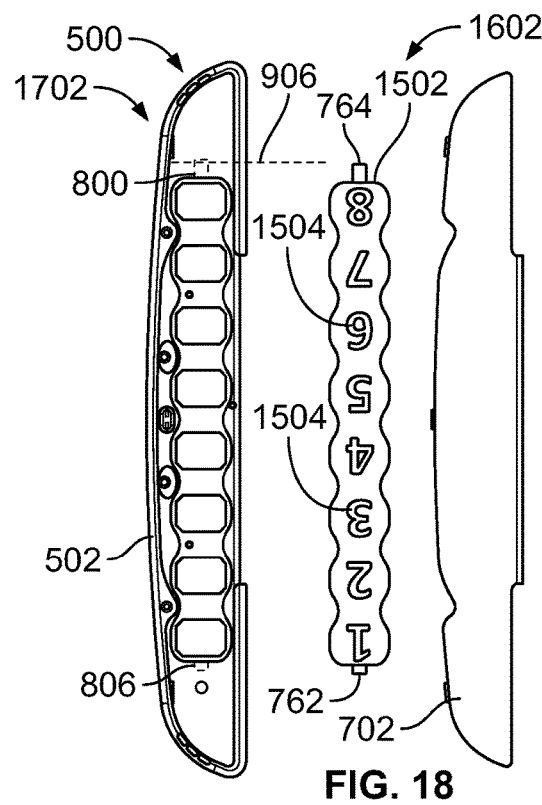
FIG. 18 illustrates the example meter of FIGS. 15-17 with the example stencil in an improper orientation.

FIG. 18 illustrates the example stencil 1502 in a fourth direction 1602 (e.g., in an opposite or inverted direction relative to the third direction 1508). In the fourth direction 1602, the visual indicators 1504 appear in an inverted or upside-down orientation when the housing 502 is in the fourth orientation 1702. When the stencil 1502 is in the fourth direction 1602 and the housing 502 is in the fourth orientation 1702, the second tab 764 is positioned in the sensing slot 800 and the first tab 762 is positioned in the slot 806. In such examples, the meter 500 determines that the stencil 1502 is improperly oriented when the housing 502 is in the fourth orientation 1702 and the sensor 760 is in a triggered state or condition (i.e., the stencil 1502 is in the second direction 1509). In some example, the meter 500 emits an alarm to provide notification that the stencil 1502 is improperly oriented relative to the housing 502.

Figure 19:
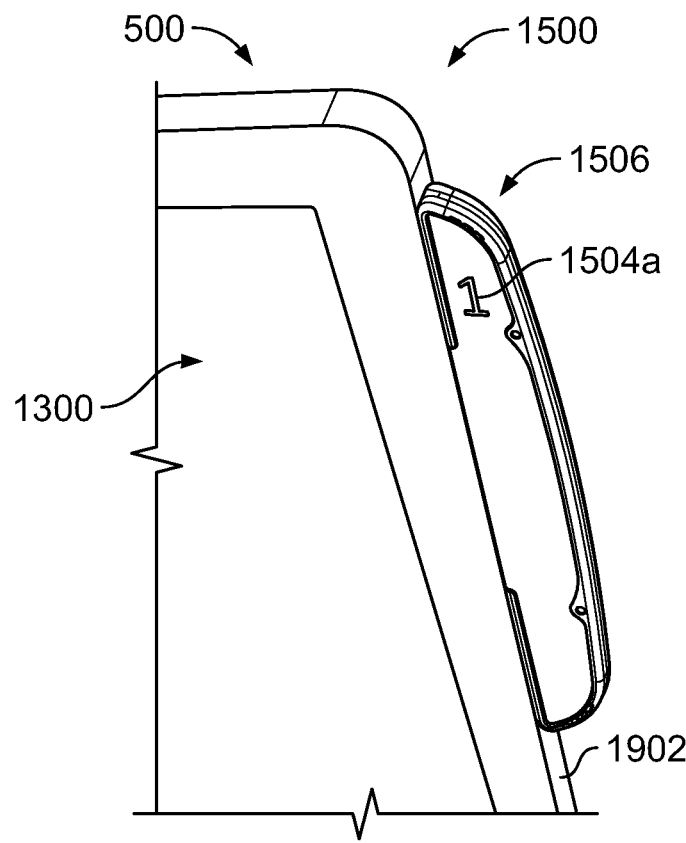
FIG. 19 illustrates the example meter of FIGS. 15-18 mounted to a media device in the third mounting orientation.

FIG. 19 is a partial, perspective view the example meter 500 of FIG. 15 mounted to the example media device 1300 (e.g., a television) in the third mounting orientation 1500 (e.g., the third mounting configuration 300 of FIG. 3, a vertical orientation). In the third mounting orientation 1500, the meter 500 of the illustrated example is configured for a right-side media device mounting configuration. For example, in the third mounting orientation 1500, the meter 500 of the illustrated example is coupled to a right surface or right-side frame 1902 of the media device 1300. As shown in FIG. 19, a first visual indicator 1504a is illuminated in an upright orientation to identify that a panelist (e.g., the panelist 106 of FIG. 1) assigned to the first visual indicator 1504a is present in a media presentation environment. To this end, the meter 500 (e.g., via a processor, a logic circuit, etc.) causes the first light 730a (FIG. 9) to illuminate the first visual indicator 1504a when the meter 500 is determined to be in the third mounting orientation 1500 (e.g., using the orientation sensor described above and/or the stencil 1502 is determined to be in the third direction 1508 (e.g., using the stencil sensor 760)).

Figure 20:
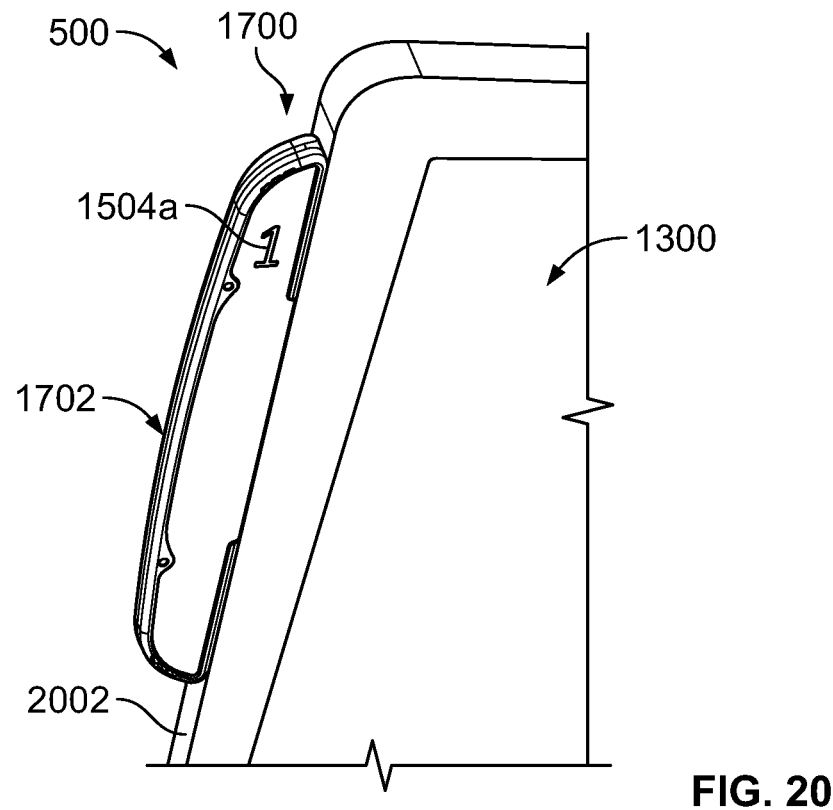
FIG. 20 illustrates the example meter of FIGS. 15-18 mounted to the media device in the fourth mounting orientation.

FIG. 20 is a perspective view the example meter 500 of FIG. 18 mounted to the example media device 1300 in the fourth mounting orientation 1700 (e.g., the fourth mounting configuration 400 of FIG. 4, a vertical orientation). In the fourth mounting orientation 1700, the meter 500 is configured for a left-side media device mounting configuration. For example, the meter 500 of the illustrated example is coupled to a left-side surface or frame 2002 of the media device 1300. As shown in FIG. 20, the first visual indicator 1504a is illuminated in an upright orientation to identify that a panelist (e.g., the panelist 106 of FIG. 1) assigned to the first visual indicator 1504a is present in the media presentation environment. Thus, although the housing 502 is in the fourth orientation 1702, the first visual indicator 1504a is in an upright or right side up orientation. To this end, the meter 500 (e.g., via a processor, a logic circuit, etc.) causes the second light 730b (FIG. 9) to illuminate the first visual indicator 1504a when the meter 500 is determined to be in the fourth mounting orientation 1700 (e.g., using the orientation sensor described above and/or the stencil 1502 is determined to be in the third direction 1508 (e.g., using the stencil sensor 760)).

Figure 21:
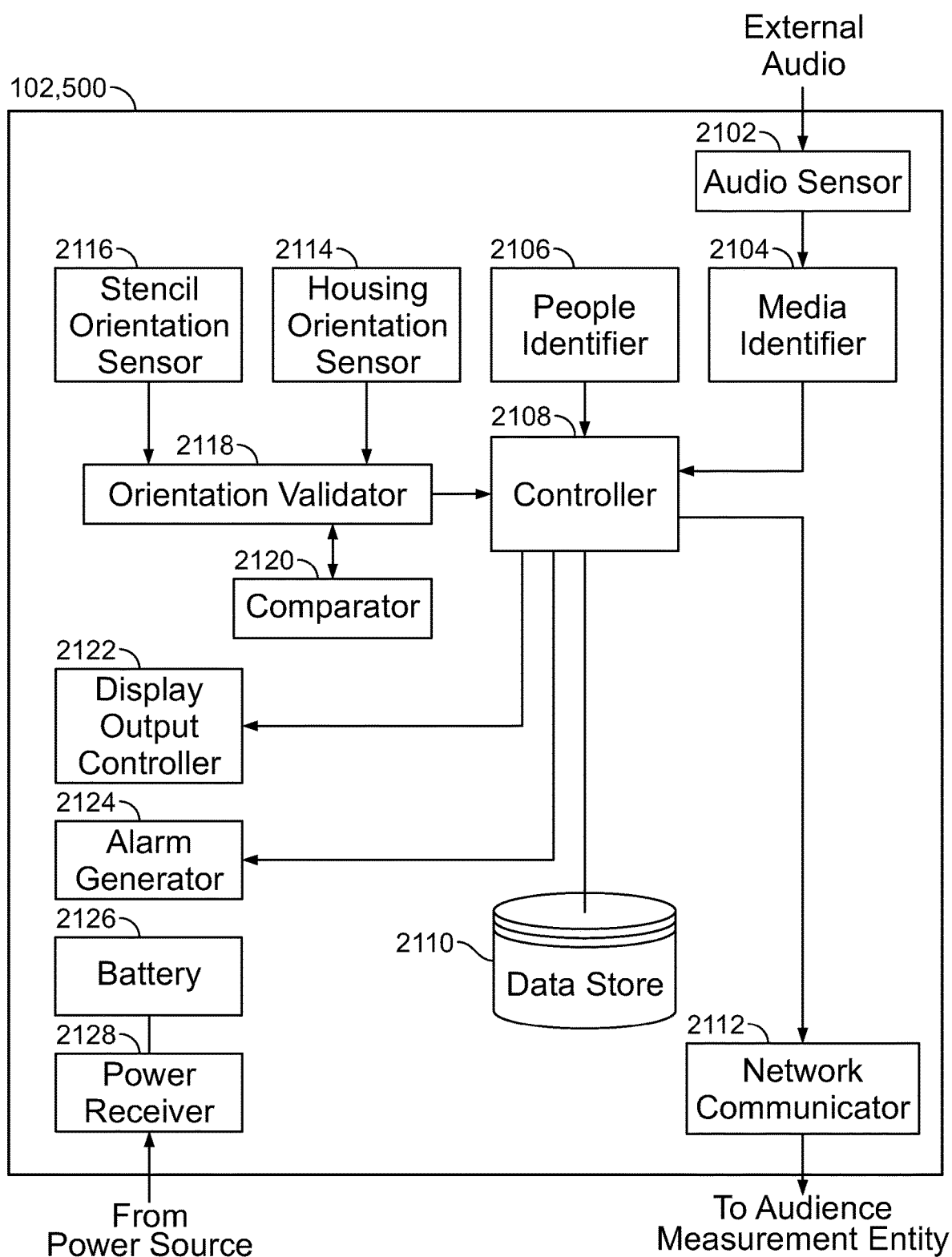
FIG. 21 is an example block diagram of the example meter of FIGS. 1-20.

FIG. 21 is a block diagram of the example meter 102, 500 of FIGS. 1-20. The example meter 102, 500 of the illustrated example includes an example audio sensor 2102, an example media identifier 2104, an example people identifier 2106, an example controller 2108, an example data store 2110, an example network communicator 2112, an example housing orientation sensor 2114, an example stencil orientation sensor 2116, and example orientation validator 2118, a comparator 2120, an example display output controller 2122, an example alarm generator 2124, an example battery 2126, and an example power receiver 2128. In some examples, the example audio sensor 2102, the example media identifier 2104, the example people identifier 2106, the example controller 2108, the example data store 2110, the example network communicator 2112, the example housing orientation sensor 2114, the example stencil orientation sensor 2116, the example orientation validator 2118, the comparator 2120, the example display output controller 2122, the example alarm generator 2124, and the example power receiver 2128 may implement the example circuit board 712 of FIG. 7.

The example audio sensor 2102 of the illustrated example of FIG. 21 is an acoustic sensor, such as a microphone. The audio sensor 2102 receives ambient sound (e.g., free field audio) including audible media presented in the vicinity of the meter 102, 500. Alternatively, the audio sensor 2102 may be implemented by a line input connection. The line input connection may allow an external microphone and/or other acoustic sensor to be used with the meter 102, 500 and/or, in some examples, may enable the audio sensor 2102 to be directly connected to an output of a media device (e.g., an auxiliary output of a television, an auxiliary output of an audio/video receiver of a home entertainment system, etc.). Advantageously, the meter 102, 500 is positioned in a location such that the audio sensor 2102 receives ambient audio produced by the media device 110, 1300 and/or other devices of the home entertainment system with sufficient quality to identify media presented by the media device 110, 1300 and/or other devices of the media presentation environment 104 (e.g., the audio/video receiver). For example, in examples disclosed herein, the meter 102, 500 may be mounted to the media device 110, 1300 in a plurality of different mounting orientations or configurations such as, for example, the first mounting orientation 134, 900, the second mounting orientation 200, 1100, the third mounting orientation 300, 1500 or the fourth mounting orientation 400, 1700. For example, the meter 102, 500 of the illustrated example may be placed on top of the television, secured to the bottom of the television, etc.

The example media identifier 2104 of the illustrated example of FIG. 21 analyzes audio received via the audio sensor 2102 and identifies the media being presented. The example media identifier 2104 of the illustrated example outputs an identifier of the media (e.g., media-identifying information) to the controller 2108 (e.g., an audience measurement data controller). In the illustrated example of FIG. 21, the example media identifier 2104 outputs a signal to noise ratio of the media identifier. In examples disclosed herein, the media identifier 2104 utilizes audio watermarking techniques to identify the media. Audio watermarking is a technique used to identify media, such as television broadcasts, radio broadcasts, advertisements (television and/or radio), downloaded media, streaming media, prepackaged media, etc. Audio watermarking techniques identify media by embedding one or more audio codes (e.g., one or more watermarks), such as media identifying information and/or one or more identifier(s) that may be mapped to media identifying information, into an audio and/or video component of the media. In some examples, the audio and/or video component of the media is selected to have a signal characteristic sufficient to hide the watermark. As used herein, the terms "code" and/or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein, "media" refers to audio and/or visual (still or moving) content and/or advertisements. In some examples, to identify watermarked media, the watermark(s) are extracted and used to access a table of reference watermarks that are mapped to media identifying information.

In some examples, the media identifier 2104 may utilize signature-based media identification techniques. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

The example controller 2108 of the illustrated example of FIG. 21 receives media identifying information (e.g., a code, a signature, etc.) from the media identifier 2104 and audience identification data from the people identifier 2106, and stores the received information in the data store 2110. The example controller 2108 periodically and/or a-periodically transmits, via the network communicator 2112, the audience measurement information stored in the data store 2110 to a central facility such as, for example, the central facility 114 of FIG. 1, for aggregation and/or preparation of media monitoring reports.

The example data store 2110 of the illustrated example of FIG. 21 may be implemented by any device for storing data such as, for example, flash memory, magnetic media, optical media, etc. Furthermore, the data stored in the example data store 2110 may be in any data format, such as, for example, binary data, comma delimited data, tab delimited data, structured query language (SQL) structures, etc. In the illustrated example, the example data store 2110 stores media identifying information collected by the media identifier 2104 and audience identification data collected by the people identifier 2106. In some examples, the example data store 2110 additionally stores panelist demographic information such that received user identifiers of the audience measurement data can be translated into demographic information prior to transmission to the central facility 114.

The example people identifier 2106 of the illustrated example of FIG. 21 determines audience identification data representative of the identities of the audience member(s) (e.g., panelists) present in the media presentation environment 104. In some examples, the people identifier 2106 collects audience identification data by periodically or a-periodically prompting audience members in the media presentation environment 104 to identify themselves as present in the audience. Panelists may identify themselves by, for example, pressing a button on a remote, speaking their name, etc. In some examples, the people identifier 2106 prompts the audience member(s) to self-identify in response to one or more predetermined events (e.g., when the media device 110 is turned on, a channel is changed, an infrared control signal is detected, etc.). The people identifier 2106 provides the audience identification data to the controller 2108 such that the audience measurement data can be correlated with the media identification data to facilitate an identification of which media was presented to which audience member.

The example network communicator 2112 of the illustrated example of FIG. 21 transmits audience measurement information provided by the controller 2108 (e.g., data stored in the data store 2110) to the central facility 114 of the audience measurement entity. In the illustrated example, the network communicator 2112 is implemented by an Ethernet port that communicates via an Ethernet network (e.g., a local area network (LAN)). In some examples, the network communicator 2112 facilitates wireless communication via a WiFi network hosted by the example gateway 116 of FIG. 1.

The housing orientation sensor 2114 of the illustrated example of FIG. 21 senses or detects an orientation of the meter 102, 500 (e.g., a mounting configuration or orientation of the housing 502). In some examples, the housing orientation sensor 2114 of the illustrated example of FIG. 21 provides a signal representative of the housing 502 being in an orientation such as, for example, the first orientation 902, the second orientation 1102, the third orientation 1506, or the fourth orientation 1702. In some examples, the housing orientation sensor 2114 of the illustrated example may provide a signal representative of the housing 502 being in an orientation other than the first orientation 902, the second orientation 1102, the third orientation 1506, or the fourth orientation 1702 (e.g., an improper orientation, an orientation indicative of the housing 502 having fallen off the media device 110, 1300, etc.). The housing orientation sensor 2114 of the illustrated example of FIG. 21 is an accelerometer. However, in some examples, the housing orientation sensor 2114 may be a gyroscope, a combination accelerometer and gyroscope, an inertial measurement apparatus, and/or any device, apparatus or system to determine or sense a position and/or orientation of the meter 102, 500 (e.g., the housing 502).

The stencil orientation sensor 2116 of the illustrated example of FIG. 21 detects or senses an orientation of the stencil 704, 1502. For example, the stencil orientation sensor 2116 of the illustrated example determines if the stencil 704 is in the first direction 904 or the second direction 1002 opposite the first direction 904, and/or determines if the stencil 1502 is in the third direction 1508 or a fourth direction 1602 opposite the third direction 1508. The stencil orientation sensor 2116 of the illustrated example of FIG. 21 may be communicatively coupled to the sensing slot 800 of the first panel 708. For example, the stencil orientation sensor 2116 may include the trigger 960 (e.g., a proximity switch or a contact) positioned in the sensing slot 800. The stencil orientation sensor 2116 provides a signal when, for example, the second tab 764 of the stencil 704 or the stencil 1502 is positioned in the sensing slot 800.

The stencil orientation sensor 2116 of the illustrated example of FIG. 21 is a contact switch (e.g., the stencil sensor 760 of FIG. 7). In some examples, the stencil orientation sensor 2116 may include two or more sensors (e.g., contact sensors) positioned in the sensing slot 800, the slot 806, and/or any other position along the display area 722. In some examples, the stencil orientation sensor 2116 may be an optical sensor to detect an orientation of the visual indicators 720 or 1504 and/or the tabs 762 and 764 of the respective stencils 704 and 1502.

The orientation validator 2118 of the illustrated example of FIG. 21 may be implemented with logic gates, logic circuit, a digital circuit, or other logic circuits or devices. However, in some examples, the orientation validator 2118 of the illustrated example of FIG. 21 may be implemented with a processor executing instructions. The orientation validator 2118 of the illustrated example of FIG. 21 generally detects or verifies an orientation of the housing 502 and/or an orientation or direction of the stencil 704, 1502 relative to the housing 502. To detect the orientation of the housing 502 and/or the stencil 704, 1502, the orientation validator 2118 of the illustrated example of FIG. 21 is communicatively coupled to the housing orientation sensor 2114 and the stencil orientation sensor 2116. For example, the orientation validator 2118 of the illustrated example of FIG. 21 detects or verifies the orientation of the housing 502 and the orientation of the stencil 704, 1502 based on the signals received from the respective housing orientation sensor 2114 and/or the stencil orientation sensor 2116.

For example, the orientation validator 2118 of the illustrated example of FIG. 21 determines if the housing 502 is properly oriented or mounted relative to, for example, the media device 110, 1300. For example, the orientation validator 2118 of the illustrated example of FIG. 21 determines that the housing 502 is properly oriented or mounted relative to the media device 110, 1300 when the housing 502 is in one of the first orientation 902, the second orientation 1102, the third orientation 1506, or the fourth orientation 1702. To determine the orientation of the housing 502, the orientation validator 2118 of the illustrated example of FIG. 21 employs the comparator 2120 to compare the input signals provided by the housing orientation sensor 2114 to values representative of the respective orientations 902, 1102, 1506, and 1702 of the housing 502.

The orientation validator 2118 and/or the controller 2108 of the illustrated example command the display output controller 2122. In some examples, the example orientation validator 2118 and/or the controller 2108 may command the display output controller 2122 to control operation of the lights 730 based on a detected mounting orientation of the housing 502 (e.g., the first orientation 902, the second orientation 1102, the third orientation 1506, or the fourth orientation 1702) and/or based on a detected direction of the stencil 704, 1502 (e.g., the first direction 904, the second direction 1002, the third direction 1508, and the fourth direction 1602). For example, the display output controller 2122 may control a particular light 730 associated with a particular visual indicator 720 of the stencil 704 or the visual indicator 1504 of the stencil 1502 based on the detected orientation of the housing 502, the detected orientation of the stencil 704, 1502, or a combination of the two).

In some examples, when the orientation validator 2118 determines that a detected orientation of the housing 502 is in the first orientation 902 or the third orientation 1506, the orientation validator 2118 or the controller 2108 causes the display output controller 2122 to associate or assign the first light 730a with the first visual indicator 720a of the stencil 704 (or the first visual indicator 1504a of the stencil 1502) and associate or assign the second light 730b with the second visual indicator 720b of the stencil 704 (or the second visual indicator 1504b of the stencil 1502). For example, if a panelist associated with the first visual indicator 720a, 1504a self-identifies when the orientation validator 2118 detects the orientation of the housing 502 in the first orientation 902 or the third orientation 1506, the display output controller 2122 illuminates the first light 730a.

In some examples, when the orientation validator 2118 determines the orientation of the housing 502 is in the second orientation 1102 or the third orientation 1702, the orientation validator 2118 or the controller 2108 causes the display output controller 2122 to associate or assign the first light 730a with the second visual indicator 720b of the stencil 704 (or the second visual indicator 1504b of the stencil 1502) and associate or assign the second light 730b with the first visual indicator 720a of the stencil 704 (or the first visual indicator 1504a of the stencil 1502). For example, if a panelist associated with the first visual indicator 720a, 1504a self-identifies when the orientation validator 2118 detects the orientation of the housing 502 in the second orientation 1102 or the fourth orientation 1702, the display output controller 2122 illuminates the second light 730b.

In some examples, when the stencil orientation sensor 2116 provides a signal to the orientation validator 2118 indicative of the stencil orientation sensor 2116 being in a triggered state or condition (e.g., the second tab 764 positioned in the sensing slot 800 and the first tab 762 positioned in the slot 806), the orientation validator 2118 or the controller 2108 causes the display output controller 2122 to associate or assign the first light 730a with the first visual indicator 720a of the stencil 704 (or the first visual indicator 1504a of the stencil 1502) and associate or assign the second light 730b with the second visual indicator 720b of the stencil 704 (or the second visual indicator 1504b of the stencil 1502). For example, if a panelist associated with the first visual indicator 720a, 1504a self-identifies when the orientation validator 2118 detects the stencil orientation sensor 2116 is in a triggered state, the display output controller 2122 illuminates the first light 730*a*.

In some examples, when the stencil orientation sensor 2116 provides a signal to the orientation validator 2118 indicative of the stencil orientation sensor 2116 being in a non-triggered state or condition (e.g., the first tab 762 positioned in the sensing slot 800 and the second tab 764 positioned in the slot 806), the orientation validator 2118 or the controller 2108 causes the display output controller 2122 to associate or assign the first light 730*a* with the second visual indicator 720*b* of the stencil 704 (or the second visual indicator 1504*b* of the stencil 1502) and associate or assign the second light 730*b* with the first visual indicator 720*a* of the stencil 704 (or the first visual indicator 1504*a* of the stencil 1502). For example, if a panelist associated with the first visual indicator 720*a*, 1504*a* self-identifies when the orientation validator 2118 detects the stencil orientation sensor 2116 is not triggered, the display output controller 2122 illuminates the second light 730*b*.

In some examples, when the orientation validator 2118 determines that the detected orientation of the housing 502 is in the first orientation 902 or the third orientation 1506 and the orientation validator 2118 determines that the stencil orientation sensor 2116 is in a triggered state, the orientation validator 2118 or the controller 2108 causes the display output controller 2122 to associate or assign the first light 730*a* with the first visual indicator 720*a* of the stencil 704 (or the first visual indicator 1504*a* of the stencil 1502) and associate or assign the second light 730*b* with the second visual indicator 720*b* of the stencil 704 (or the second visual indicator 1504*b* of the stencil 1502). For example, if a panelist associated with the first visual indicator 720*a*, 1504*a* self-identifies when the orientation validator 2118 detects the orientation of the housing 502 is in the first orientation 902 or the third orientation 1506 and detects the stencil orientation sensor 2116 in a triggered state, the display output controller 2122 illuminates the first light 730*a*.

In some examples, when the orientation validator 2118 determines the orientation of the housing 502 is in the second orientation 1102 or the fourth orientation 1702 and determines that the stencil orientation sensor 2116 is not in a triggered state, the orientation validator 2118 or the controller 2108 causes the display output controller 2122 to associate or assign the first light 730*a* with the second visual indicator 720*b* of the stencil 704 (or the second visual indicator 1504*b* of the stencil 1502) and associate or assign the second light 730*b* with the first visual indicator 720*a* of the stencil 704 (or the first visual indicator 1504*a* of the stencil 1502). For example, if a panelist associated with the first visual indicator 720*a*, 1504*a* self-identifies when the orientation validator 2118 detects the orientation of the housing 502 in the second orientation 1102 or the fourth orientation 1702 and the stencil orientation sensor 2116 is not triggered, the display output controller 2122 illuminates the second light 730*b*.

In some examples, the operation of the stencil orientation sensor 2116 is not limited to the described examples but, for example, could be reversed (e.g., behavior associated with the stencil orientation sensor 2116 being triggered could alternatively be associated with the stencil orientation sensor 2116 not being triggered, and vice versa. In some examples, the stencil orientation sensor 2116 may include multiple sensors (e.g., two contact switches) positioned in the sensing slot 800 and/or the slot 806 that may be configured to distinguish between the first tab 762 and the second tab 764.

In some examples, the orientation validator 2118 determines if the housing 502 is oriented in a position that is not one of the first orientation 902, the second orientation 1102, the third orientation 1506, or the fourth orientation 1702. For example, if the orientation validator 2118 determines that the orientation of the housing 502 is not in one of the first orientation 902, the second orientation 1102, the third orientation 1506, or the fourth orientation 1702, the orientation validator 2118 determines that the housing 502 is in an improper orientation.

In some such examples, the orientation validator 2118 may command the controller 2108 and/or the alarm generator 2124 to initiate an alarm or warning until the orientation validator 2118 determines that the orientation of the housing 502 is the first orientation 902, the second orientation 1102, the third orientation 1506, or the fourth orientation 1702. The alarm generator 2124 may initiate an audible alarm via, for example, a speaker (e.g., positioned or coupled to the circuit board 712) of the meter 102, 500 and/or a visual alarm via, for example, the lights 730, the status indicator light 731 and/or any other light of the meter 102, 500. For example, the alarm generator 2124 may cause the display output controller 2122 to illuminate one or more of the lights 730, the status indicator light 731 and/or another other light of the meter 102, 500.

Additionally, the orientation validator 2118 of the illustrated example of FIG. 21 determines or verifies if the stencil 704 or 1502 is properly oriented relative to the determined orientation of the housing 502. For example, to determine the direction of the stencil 704, 1502, the orientation validator 2118 of the illustrated example of FIG. 21 employs the comparator 2120 to compare a signal provided with the stencil orientation sensor 2116 with the signal provided by the housing orientation sensor 2114. In other words, the orientation validator 2118 determines if the stencil 704 or 1502 is properly oriented relative to a detected orientation of the housing 502.

In some examples, the orientation validator 2118 determines the stencil 704, 1502 is properly oriented relative to an orientation of the housing 502 when the orientation validator 2118 receives a signal from the housing orientation sensor 2114 indicative of the housing 502 being in the first orientation 902 or the third orientation 1506 and the orientation validator 2118 receives a signal from the stencil orientation sensor 2116 that the stencil orientation sensor 2116 is in a triggered state or condition (e.g., the second tab 764 positioned in the sensing slot 800 and the first tab 762 positioned in the slot 806).

In some examples, the orientation validator 2118 determines the stencil 704, 1502 is properly oriented relative to an orientation of the housing 502 when the orientation validator 2118 receives a signal from the housing orientation sensor 2114 indicative of the housing 502 being in the second orientation 1102 or the fourth orientation 1702 and the orientation validator 2118 receives a signal from the stencil orientation sensor 2116 indicative of the stencil orientation sensor 2116 being in a non-triggered state or condition (e.g., the first tab 762 positioned in the sensing slot 800 and the second tab 764 positioned in the slot 806).

In some examples, the orientation validator 2118 determines that the stencil 704, 1502 is improperly oriented relative to the housing 502. In some such examples, the orientation validator 2118 determines that the stencil 704, 1502 is improperly oriented relative to the housing 502 when the housing orientation sensor 2114 provides a signal to the orientation validator 2118 indicative of the housing 502 being in the first orientation 902 or the third orientation 1506 and the stencil orientation sensor 2116 provides a signal to the orientation validator 2118 indicative of the indicative of the stencil orientation sensor 2116 being in a non-triggered state or condition (e.g., the first tab 762 positioned in the sensing slot 800 and the second tab 764 positioned in the slot 806).

In some examples, the orientation validator 2118 determines that the stencil 704 or 1502 is improperly oriented relative to the housing 502 when the housing orientation sensor 2114 provides a signal to the orientation validator 2118 indicative of the housing 502 being in the second orientation 1102 or the fourth orientation 1702 and receives a signal from the stencil orientation sensor 2116 indicative of the stencil orientation sensor 2116 being in a triggered state or condition (e.g., the second tab 764 positioned in the sensing slot 800 and the first tab 762 positioned in the slot 806).

In some examples, the orientation validator 2118 and/or the controller 21089 provide an alarm or warning via the alarm generator 2124 when the stencil 704, 1502 is improperly oriented relative to a detected orientation of the housing 502. The alarm generator 2124 may initiate an audible alarm via, for example, a speaker of the meter 102, 500 and/or a visual alarm via, for example, the lights 730, the status indicator light 731 and/or any other light of the meter 102, 500. For example, the alarm generator 2124 may cause the display output controller 2122 to illuminate one or more of the lights 730 and/or another other light of the meter 102, 500.

The example power receiver 2128 of the illustrated example of FIG. 21 is implemented as a universal serial bus (USB) receptacle (e.g., the first connector 602) and enables the meter 102, 500 to be connected to a power source via a cable (e.g., a USB cable). In examples disclosed herein, the media device 110, 1300 has a USB port that provides electrical power to, for example, an external device such as the meter 102, 500. In some examples, the media device 110, 1300 may provide power to an external device via a different type of port such as, for example, a High Definition Media Interface (HDMI) port, an Ethernet port, etc. The example power receiver 2128 may be implemented in any fashion to facilitate receipt of electrical power from the media device 110 or any other power source (e.g., a wall outlet).

The example battery 2126 of the illustrated example of FIG. 21 stores power for use by the meter 102, 500. The example battery 2126 enables operation of the meter 102, 500 when power is not being supplied to the meter 102, 500 via the power receiver 2128. In the illustrated example of FIG. 21, the example battery 2126 is implemented using a lithium-ion battery. However, any other type of battery may additionally or alternatively be used. In the illustrated example of FIG. 21, the example battery 2126 is rechargeable. As such, the example battery 2126 may be recharged while the meter 102, 500 receives power via the power receiver 2128 (e.g., while the media device 110, 1300 is powered on), to facilitate operation of the meter 102, 500 when the meter 102, 500 is not receiving power via the power receiver 2128 (e.g., while the media device 110, 1300 is powered off). However, in some examples, the example battery 2126 may be non-rechargeable.

While an example manner of implementing the meter 102, 500 of FIGS. 1-20 is illustrated in FIG. 21, one or more of the elements, processes and/or devices illustrated in FIG. 21 may be combined, divided, re-arranged, omitted, eliminated and/or implemented in any other way. Further, the example audio sensor 2102, the example media identifier 2104, the example people identifier 2106, the example controller 2108, the example data store 2110, the example network communicator 2112, the example housing orientation sensor 2114, the example stencil orientation sensor 2116, the example orientation validator 2118, the comparator 2120, the example display output controller 2122, the example alarm generator 2124, and/or the example power receiver 2128 and/or, more generally, the example meter 102, 500 of FIGS. 1-20 may be implemented by hardware, software, firmware and/or any combination of hardware, software and/or firmware. Thus, for example, any of the example audio sensor 2102, the example media identifier 2104, the example people identifier 2106, the example controller 2108, the example data store 2110, the example network communicator 2112, the example housing orientation sensor 2114, the example stencil orientation sensor 2116, the example orientation validator 2118, the comparator 2120, the example display output controller 2122, the example alarm generator 2124, and/or the example power receiver 2128 and/or, more generally, the example meter 102, 500 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio sensor 2102, the example media identifier 2104, the example people identifier 2106, the example controller 2108, the example data store 2110, the example network communicator 2112, the example housing orientation sensor 2114, the example stencil orientation sensor 2116, the example orientation validator 2118, the comparator 2120, the example display output controller 2122, the example alarm generator 2124, and/or the example power receiver 2128 is/are hereby expressly defined to include a tangible computer readable storage device or storage disk such as a memory, a digital versatile disk (DVD), a compact disk (CD), a Blu-ray disk, etc. storing the software and/or firmware. Further still, the example meter 102, 500 of FIGS. 1-16, 17A, 17B, and 18-20 may include one or more elements, processes and/or devices in addition to, or instead of, those illustrated in FIG. 21, and/or may include more than one of any or all of the illustrated elements, processes and devices.

Flowcharts representative of example machine readable instructions for implementing the meter 102, 500 of FIG. 21 is shown in FIGS. 22-27. In this example, the machine readable instructions comprise a program for execution by a processor such as the processor 2612 shown in the example processor platform 2600 discussed below in connection with FIG. 26. The program may be embodied in software stored on a tangible computer readable storage medium such as a CD-ROM, a floppy disk, a hard drive, a digital versatile disk (DVD), a Blu-ray disk, or a memory associated with the processor 2612, but the entire program and/or parts thereof could alternatively be executed by a device other than the processor 2612 and/or embodied in firmware or dedicated hardware. Further, although the example program is described with reference to the flowcharts illustrated in FIGS. 22-27, many other methods of implementing the example meter 102, 500 may alternatively be used. For example, the order of execution of the blocks may be changed, and/or some of the blocks described may be changed, eliminated, or combined.

As mentioned above, the example processes of FIGS. 22-25 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 22-27 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 22:
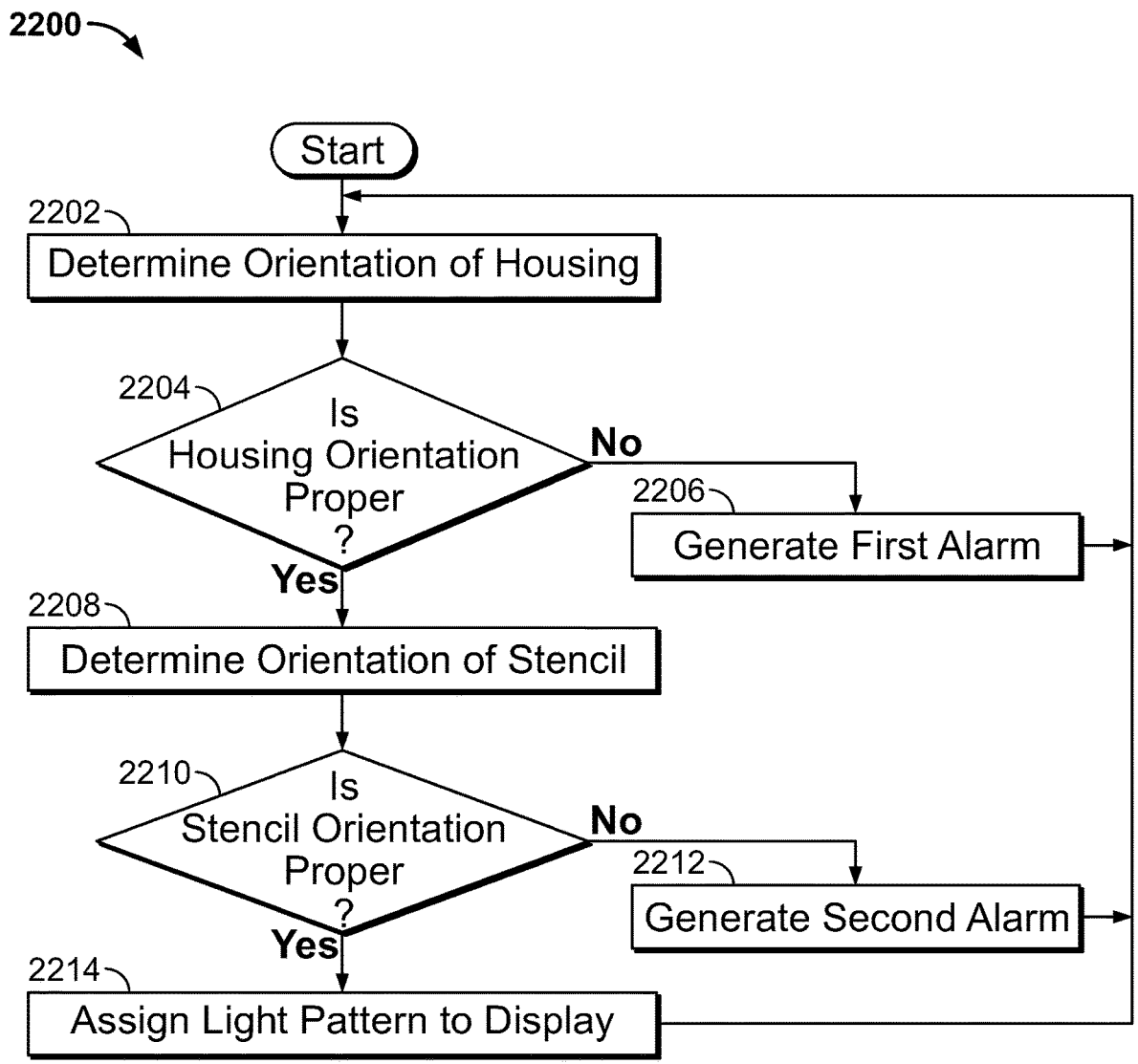
FIGS. 22-27 are flowcharts representative of example machine-readable instructions that may be executed to implement the example meter of FIGS. 1-21.

FIG. 22 is a flowchart representative of example machine-readable instructions 2200 that may be executed to implement the meter 102, 500 of FIGS. 1-16, 17A, and 18-21 to determine a housing orientation and/or a stencil orientation. The program of FIG. 22 begins at block 2202 when the example orientation validator 2118 determines the orientation of the example housing 502 (block 2202). For example, the orientation validator 2118 determines the orientation of the housing 502 based on a signal received from the housing orientation sensor 2114.

If the orientation validator 2118 determines that the housing 502 is not in a proper orientation (block 2204 returns a result of NO), the example orientation validator 2118 commands the alarm generator 2124 to output a first alarm (block 2206). In some examples, the first alarm may be an audible alarm generated by the alarm generator 2124 via, for example, a speaker. In some examples, the first alarm may be a visual alarm generated by the alarm generator 2124 and/or the display output controller via, for example, one or more of the lights 730 and/or any other light of the meter 102, 500 (e.g., a status indicator light positioned on the circuit board 712).

The orientation validator 2118 also determines the orientation of the stencil 704, 1502 (block 2208). For example, the orientation validator 2118 determines the orientation of the stencil 704, 1502 based on a signal received from the stencil orientation sensor 2116. In particular, the orientation validator 2118 determines if the stencil 704, 1502 is in a proper orientation (block 2210). For example, the orientation validator 2118 determines that the stencil 704, 1502 is in a proper orientation when the signal received from the stencil orientation sensor 2116 is indicative of the stencil 704 or the stencil 1502 being in the first direction 904 or the third direction 1508 when the orientation validator 2118 determines that the housing 502 is in one of the first orientation 902 or the third orientation 1506, or the stencil 704, 1502 being in the second direction 1002 or the fourth direction 1602 when the housing 502 is in one of the second orientation 1102 or the fourth orientation 1702.

If the orientation validator 2118 determines that the stencil 704 or the stencil 1502 is not in a proper orientation (block 2210 returns a result of NO), the example orientation validator 2118 commands the alarm generator 2124 to output a second alarm (block 2212). In some examples, the alarm generator 2124 may generate an audible alarm via, for example, a speaker. In some examples, the alarm generator 2124 may generate a visual alarm via, for example, one or more of the lights 730 and/or any other light of the meter 102, 500 (e.g., a light positioned on the circuit board 712). In some examples, the first alarm generated at block 2206 is the same as the second alarm generated at block 2212. In some examples, the first alarm generated at block 2206 is different than the second alarm generated at block 2212. In some examples, the first alarm is an audible alarm and the second alarm is a visual alarm.

If the orientation validator 2118 determines that the stencil 704 or the stencil 1502 is in a proper orientation (block 2210 returns a result of YES), the example orientation validator 2118 causes the display output controller 2122 to operate the lights 730 in a specific pattern (block 2214). For example, the display output controller 2122 controls the illumination of the lights 730 to provide a light pattern based on the detected orientation of the housing 502 and/or by detecting direction of the stencil 704, 1502.

In a first example, if the orientation validator 2118 determines that an orientation of the housing 502 is in the first orientation 902 or the third orientation 1506, the display output controller 2122 associates the first light 730a to the first visual indicator 720a, 1504a and associates the second light 730b to the second visual indicator 720b, 1504b. In such an example, if the orientation validator 2118 determines that an orientation of the housing 502 is in the second orientation 1102 or the fourth orientation 1702, the display output controller 2122 associates the first light 730a to the second visual indicator 720b, 1504b and assigns the first light 730a to the first visual indicator 720a, 1504a.

In a second example, if the orientation validator 2118 determines that an orientation of the stencil 704, 1502 is such that the stencil orientation sensor 2116 is triggered (e.g., the second tab 764 is positioned in the sensing slot 800), the display output controller 2122 associates the first light 730a to the first visual indicator 720a, 1504a and associates the second light 730b to the second visual indicator 720b, 1504b. In such an example, if the orientation validator 2118 determines that an orientation of the stencil 704, 1502 is such that the stencil orientation sensor 2116 is not triggered (e.g., the first tab 762 is in the sensing slot 800), the display output controller 2122 associates the first light 730a to the second visual indicator 720b, 1504b and assigns the first light 730a to the first visual indicator 720a, 1504a.

In a third example, the orientation validator 2118 determines the operation of the lights 730 based on a combination of the orientation of the housing 502 and the orientation of the stencil 704, 1502. In such an example, if the orientation validator 2118 determines that an orientation of the housing 502 is in the first orientation 902 or the third orientation 1506, and the orientation validator 2118 determines that the orientation of the stencil 704, 1502 is such that the stencil orientation sensor 2116 is triggered (e.g., the second tab 764 is positioned in the sensing slot 800), the display output controller 2122 associates the first light 730a to the first visual indicator 720a, 1504a and associates the second light 730b to the second visual indicator 720b, 1504b. In such an example, if the orientation validator 2118 determines that an orientation of the housing 502 is in the second orientation 1102 or the fourth orientation 1702 and the orientation validator 2118 determines that an orientation of the stencil 704, 1502 is such that the stencil orientation sensor 2116 is not triggered (e.g., the first tab 762 is in the sensing slot 800), the display output controller 2122 associates the first light 730a to the second visual indicator 720b, 1504b and assigns the first light 730a to the first visual indicator 720a, 1504a. In some such examples, if neither of the foregoing conditions is detected, the second orientation 1102 determines the combined orientations of the stencil 704, 1502 and the housing 502 are invalid, and causes the display output controller 2122 to operate the lights 730 to indicate (e.g., by causing the lights 730 to blink periodically or according to some other pattern) an invalid orientation combination has been detected. The program returns to block 2202.

Figure 23:
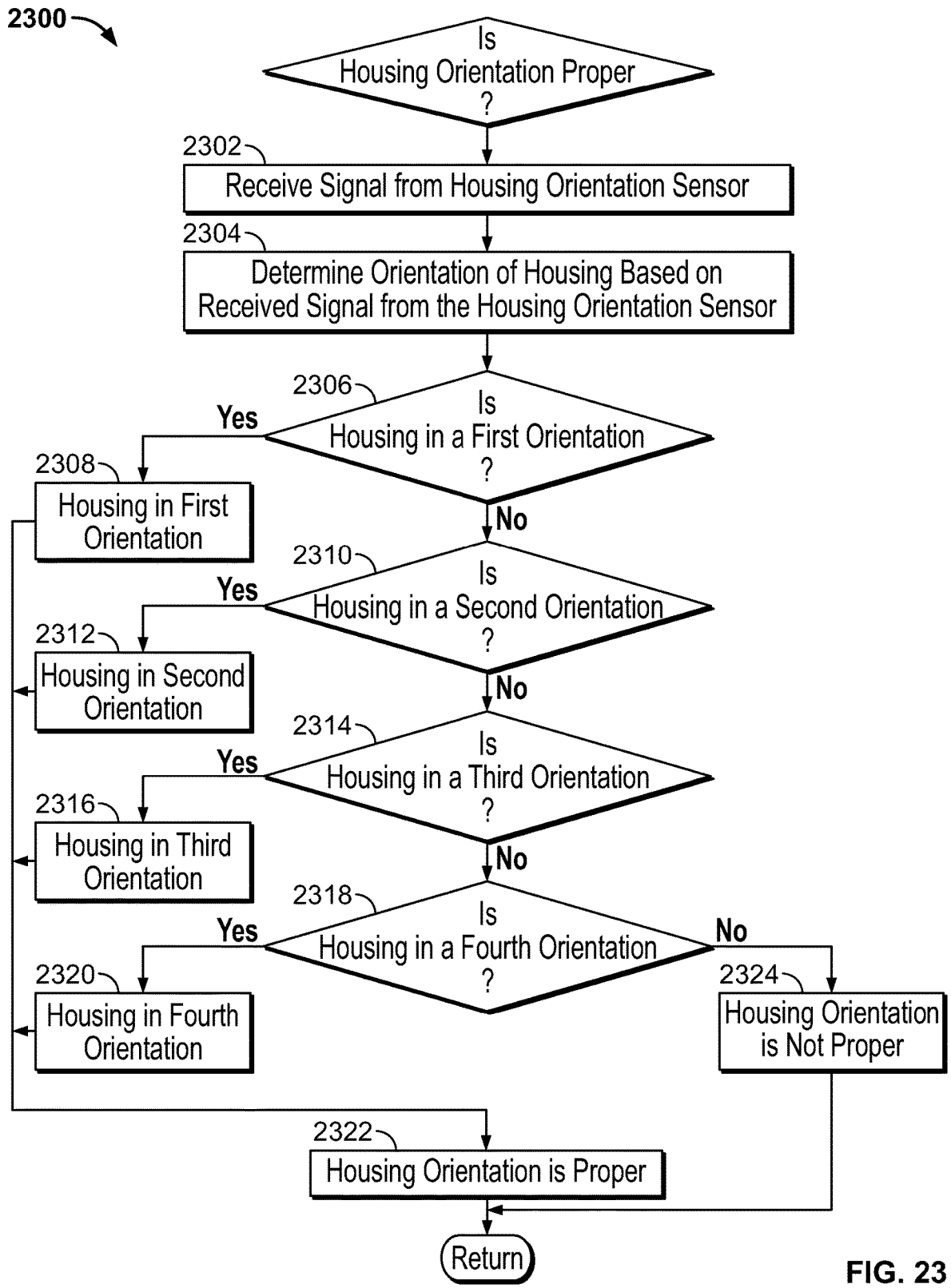

FIG. 23 is a flowchart representative of example machine-readable instructions 2300 that may be executed by the example meter 102, 500 of FIGS. 1-16, 17A, and 18-21 to determine if the housing 502 is in a proper orientation. The program of FIG. 23 begins at block 2302 when the example orientation validator 2118 receives a signal from the housing orientation sensor 2114 (block 2302). For example, the orientation validator 2118 may receive a signal from an accelerometer representative of the orientation of the housing 502 relative to the media device 110, 1300.

The orientation validator 2118 determines the orientation of the housing 502 based on the received signal from the housing orientation sensor 2114 (block 2304). If the signal received by the orientation validator 2118 is indicative of the housing 502 being in the first orientation 902 (block 2306), the orientation validator 2118 determines that the housing 502 is in the first orientation (block 2308).

If the orientation validator 2118 determines that the signal received from the housing orientation sensor 2114 is not indicative of the housing 502 being in the first orientation 902 (block 2306 results in NO), the orientation validator 2118 determines if the housing 502 is in the second orientation 1102 (block 2310). If the signal received by the orientation validator 2118 is indicative of the housing 502 being in the second orientation 1102 at block 2310, the orientation validator 2118 determines that the housing 502 is in the second orientation 1102 (block 2312).

If the orientation validator 2118 determines that the signal received from the housing orientation sensor 2114 is not indicative of the housing 502 being in the second orientation 1102 (block 2310 results in NO), the orientation validator 2118 determines if the housing 502 is in the third orientation 1506 (block 2314). If the signal received by the orientation validator 2118 indicates the housing 502 is in the third orientation 1506 at block 2314, the orientation validator 2118 determines that the housing 502 is in the third orientation 1506 (block 2316).

If the orientation validator 2118 determines that the signal received from the housing orientation sensor 2114 is not indicative of the housing 502 being in the third orientation 1506 (block 2314 results in NO), the orientation validator 2118 determines if the housing 502 is in the fourth orientation 1702 (block 2318). If the signal received by the orientation validator 2118 indicates that the housing 502 is in the fourth orientation 1702 at block 2318, the orientation validator 2118 determines that the housing 502 is in the fourth orientation (block 2320).

If the orientation validator 2118 determines that the housing 502 is in either the first orientation 902, the second orientation 1102, the third orientation 1506 or the fourth orientation 1820 (blocks 2306-2320), the orientation validator 2118 determines that the housing 502 is in the proper orientation (block 2322). In some examples, the orientation validator 2118 may store in memory (e.g., the data store 2110) a value representative of the orientation of the housing in the first orientation (block 2308), the second orientation (block 2312), the third orientation (block 2316) or the fourth orientation (block 2318). The stored housing orientation information may be retrieved from memory by the orientation validator 2118 to determine if the stencil 704, 1502 is properly oriented relative to the determined orientation of the housing 502 and/or the light pattern (e.g., block 2214 of FIG. 22) to be provided by the display output controller 2122.

If the orientation validator 2118 determines that the housing 502 is not in the first orientation 902, the second orientation 1102, the third orientation 1506 or the fourth orientation 1820 at blocks 2306, 2310, 2314 and 2318, respectively, the orientation validator 2118 determines that the orientation of the housing 502 is improper (block 2324).

Figure 24:
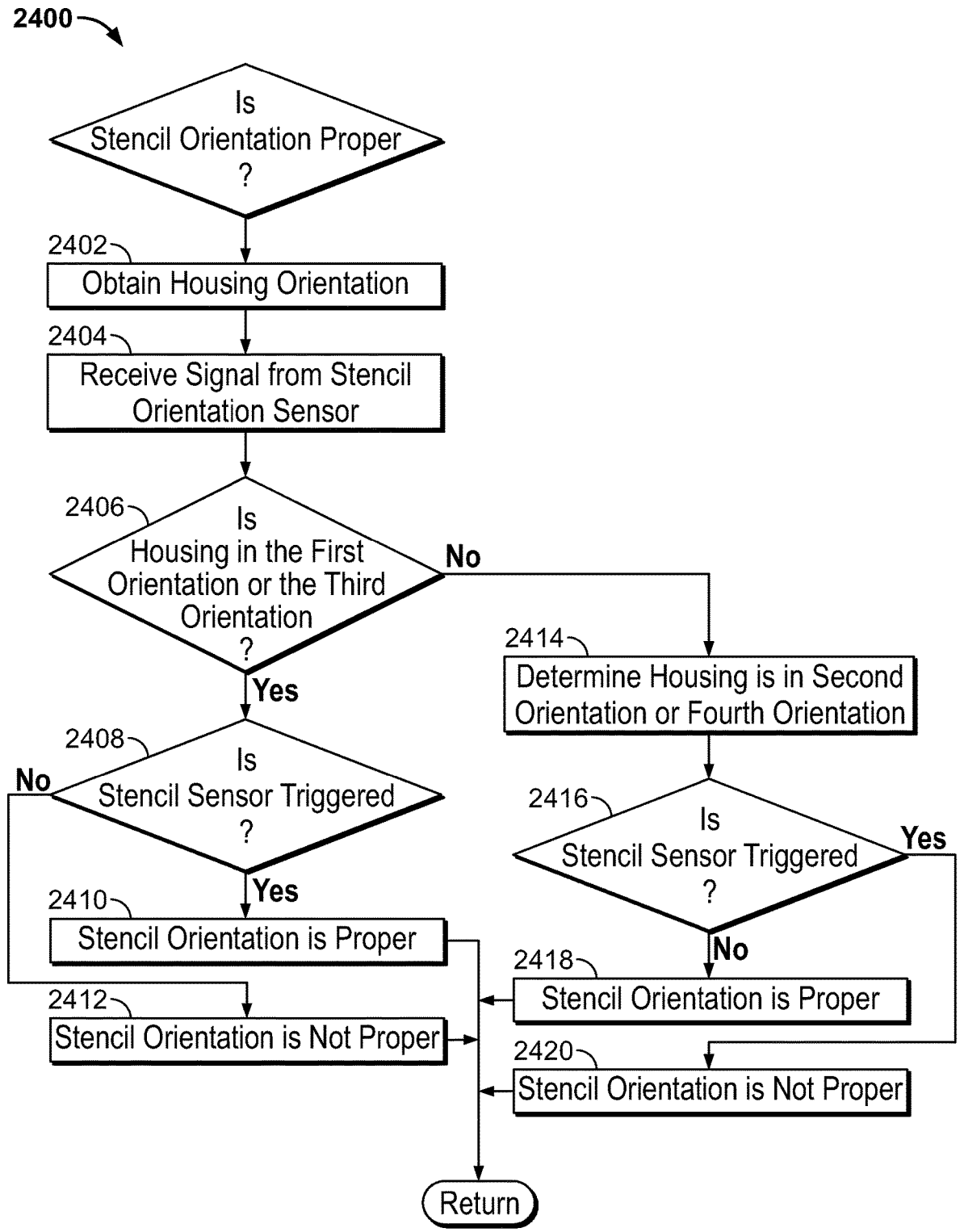

FIG. 24 is a flowchart representative of example machine-readable instructions 2400 that may be executed by the meter 102, 500 of FIGS. 1-16, 17A, and 18-21 to determine if the stencil 704, 1502 is in the proper orientation (e.g., block 2210 of FIG. 22). The program of FIG. 24 begins when the orientation validator 2118 determines or obtains the orientation of the housing 502 (block 2402). For example, the orientation validator 2118 may determine the housing orientation from the example program 2300 of FIG. 23. The orientation validator 2118 receives a signal from the stencil orientation sensor 2116 (block 2404). The orientation validator 2118 determines if the housing 502 is in the first orientation 902 or the third orientation 1506 (block 2406).

If the orientation validator 2118 determines that the housing 502 is in the first orientation 902 or the third orientation 1506 at block 2406, the orientation validator 2118 determines if the signal received from the stencil orientation sensor 2116 is indicative of the stencil sensor 760 being in a triggered state or condition (block 2408). If the orientation validator 2118 determines that the stencil orientation sensor 2116 is triggered at block 2408, the orientation validator 2118 determines that the stencil 704, 1502 is in a proper orientation (block 2410). For example, the orientation of the stencil 704 is proper when the housing 502 is in the first orientation 902 and the second tab 764 of the stencil 704 is in the sensing slot 800. Alternatively, the orientation of the stencil 1502 is proper when the housing 502 is in the third orientation 1506 and the second tab 764 of the stencil 1502 is in the sensing slot 800.

If the orientation validator 2118 determines that the stencil orientation sensor 2116 is in not triggered at block 2408, the orientation validator 2118 determines that the orientation of the stencil 704, 1502 is not proper (block 2412). For example, the orientation of the stencil 704 is improper when the housing 502 is in the first orientation 902 and the second tab 764 of the stencil 704 is in the slot 806. Alternatively, the orientation of the stencil 1502 is improper when the housing 502 is in the third orientation 1506 and the second tab 764 of the stencil 1502 is in the slot 806.

If the orientation validator 2118 determines that the housing 502 is not in the first orientation 902 or the third orientation 1506 at block 2406, the orientation validator 2118 determines if the housing 502 is in the second orientation 1102 or the fourth orientation 1702 (block 2414). The orientation validator 2118 determines if the signal received from the stencil orientation sensor 2116 is indicative of the stencil sensor 760 being in a triggered or active state or condition (block 2416).

If the orientation validator 2118 determines that the signal provided by the stencil orientation sensor 2116 is indicative of a non-triggered state or condition at block 2416, the orientation validator 2118 determines that the stencil 704, 1502 is in a proper orientation (block 2418). For example, the orientation of the stencil 704 is proper when the housing 502 is in the second orientation 1102 and the second tab 764 of the stencil 704 is in the slot 806. Alternatively, the orientation of the stencil 1502 is proper when the housing 502 is in the fourth orientation 1702 and the second tab 764 of the stencil 1502 is in the slot 806.

If the orientation validator 2118 determines that the signal provided by the stencil orientation sensor 2116 is indicative of a triggered state or condition at block 2416, the orientation determiner determines that the orientation of the stencil 704, 1502 is not proper (block 2420). For example, the orientation of the stencil 704 is not proper when the housing 502 is in the second orientation 1102 and the second tab 764 of the stencil 704 is in the sensing slot 800. Alternatively, the orientation of the stencil 1502 is not proper when the housing 502 is in the fourth orientation 1702 and the second tab 764 of the stencil 1502 is in the sensing slot 800.

Figure 25:
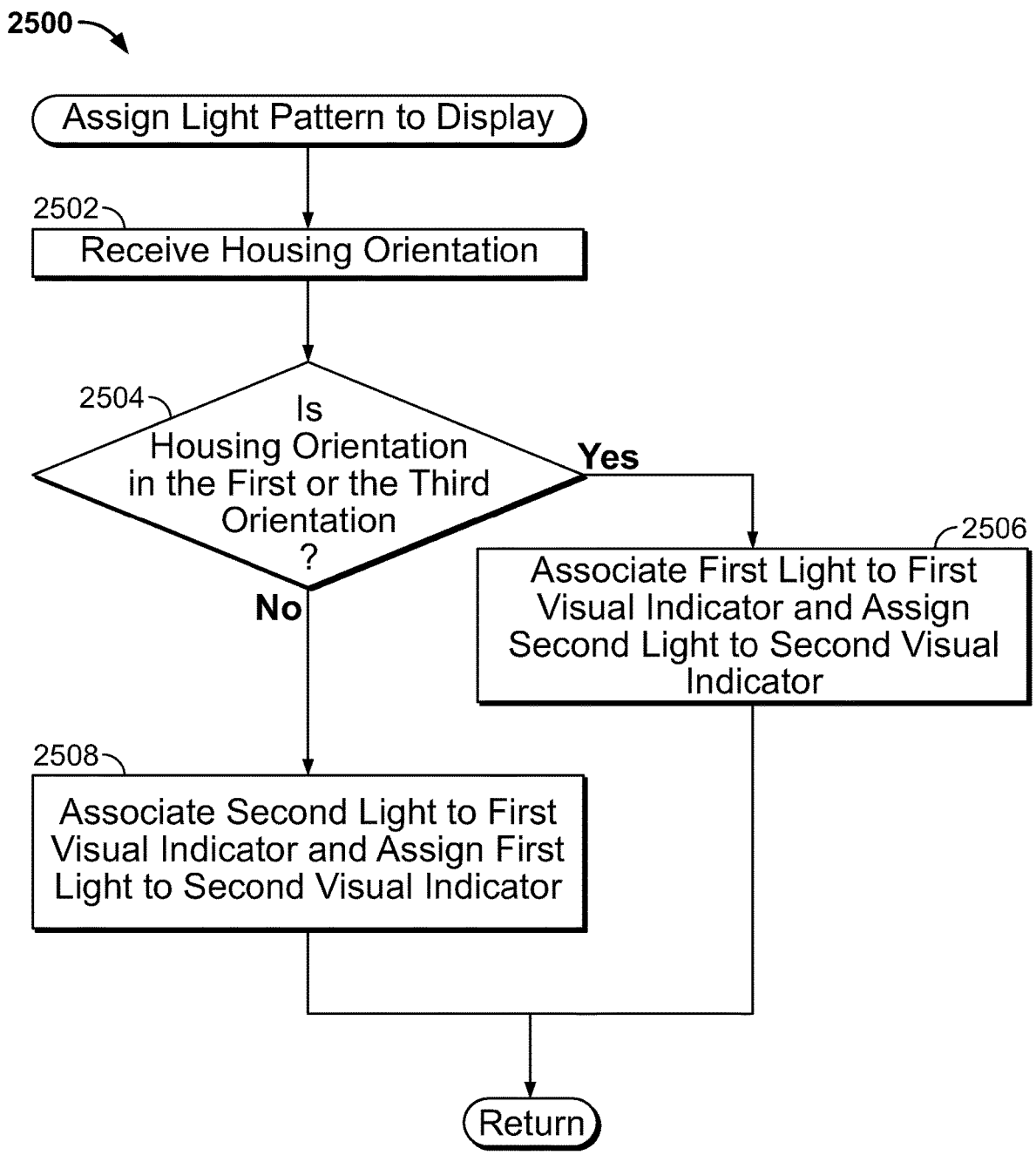

FIG. 25 is a flowchart representative of first example machine-readable instructions 2500 that may be executed by the meter 102, 500 of FIGS. 1-16, 17A, and 18-21 to control the lights 730 of the meter 102, 500 (e.g., block 2214 of FIG. 22) based on a detected housing orientation. The program of FIG. 25 begins when the orientation validator 2118 determines the orientation of the housing 502 (block 2502). For example, the orientation validator 2118 may determine the orientation of the housing 502 from the example program 2300 of FIG. 23. If the orientation validator 2118 determines that the housing 502 is in the first orientation 902 or the third orientation 1506 (block 2504), then the display output controller 2122 causes the first light 730a to illuminate the first visual indicator 720a of the stencil 704 or the first visual indicator 1504a of the stencil 1502, and causes the second light 730b to illuminate the second visual indicator 720b of the stencil 704 or the second visual indicator 1504b of the stencil 1502.

If the orientation validator 2118 determines that the housing 502 is not in the first orientation 902 or the third orientation 1506 at block 2504, then the display output controller 2122 causes the first light 730a to illuminate the second visual indicator 720b of the stencil 704 or the second visual indicator 1504b of the stencil 1502, and causes the second light 730b to illuminate the first visual indicator 720a of the stencil 704 or the first visual indicator 1504a of the stencil 1502 (block 2508). For example, the display output controller 2122 reverses the operation of the lights 730 when the housing 502 is in the second orientation 1102 or the fourth orientation 1702.

Figure 26:
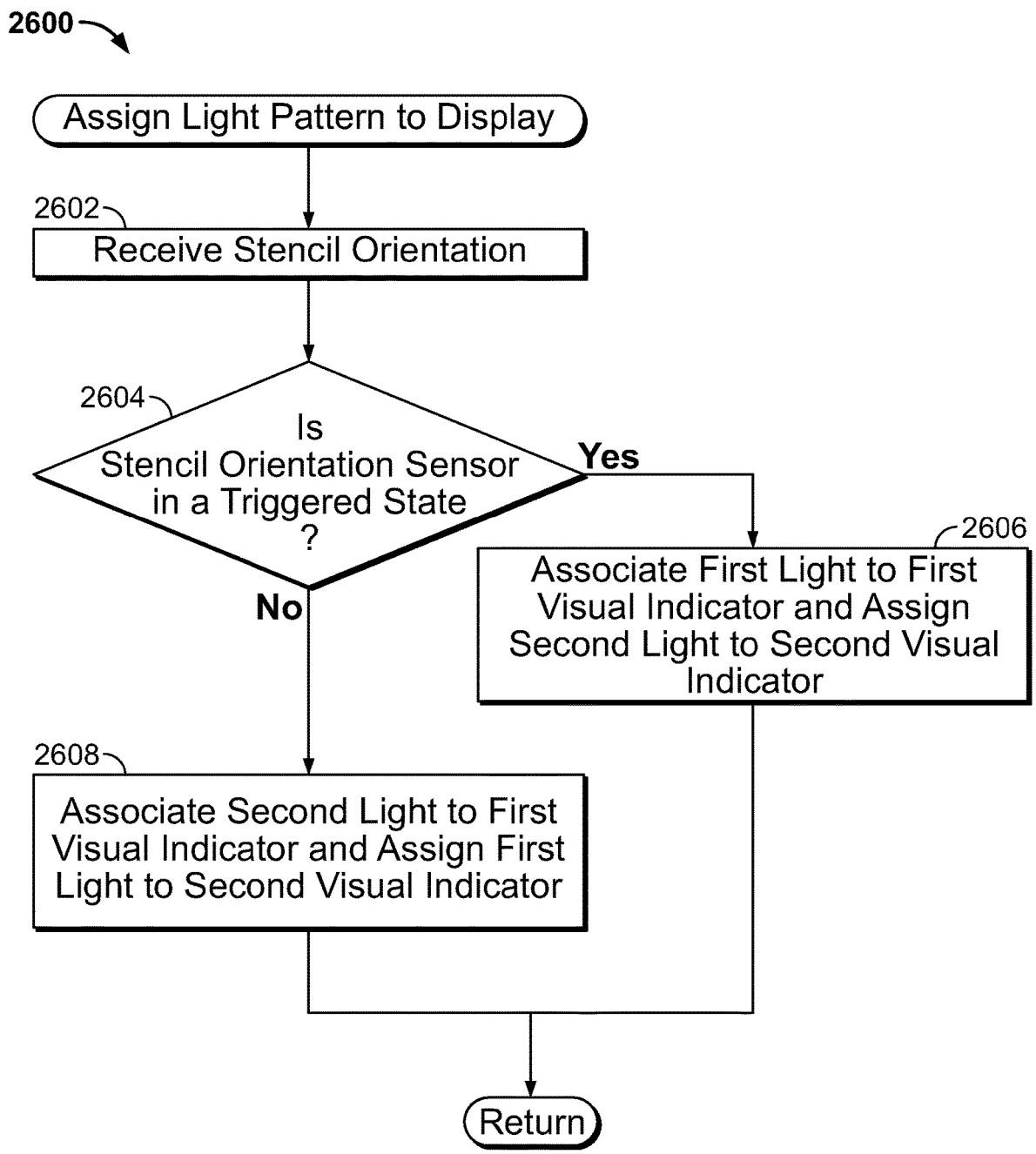

FIG. 26 is a flowchart representative of second example machine-readable instructions 2600 that may be executed by the meter 102, 500 of FIGS. 1-21 to control the lights 730 of the meter 102, 500 (e.g., block 2208 of FIG. 22) based on a detected stencil direction. The program of FIG. 26 begins when the orientation validator 2118 receives a stencil orientation signal from the stencil orientation sensor 2116 (block 2602). Based on the received signal from the stencil orientation sensor 2116, the orientation validator 2118 determines if the stencil orientation sensor 2116 is in a triggered state (block 2604). For example, the stencil orientation sensor 2116 is in a triggered state when the second tab 764 of the stencil 704, 1502 is in the sensing chamber 800 and triggers the sensor 760. If the orientation validator 2118 determines that the stencil orientation sensor 2116 is in a triggered state at block 2604, the validation determiner 2118 commands or causes the display output controller 2122 to operate the first light 730a to illuminate the first visual indicator 720a of the stencil 704 or the first visual indicator 1504a of the stencil 1502, and commands or causes the display output controller 2122 to associate or operate the second light 730b to illuminate the second visual indicator 720b of the stencil 704 or the second visual indicator 1504b of the second stencil 1502 (block 2606).

If the orientation validator 2118 determines that the stencil orientation sensor 2116 is in a non-triggered state at block 2604, the validation determiner 2118 commands or causes the display output controller 2122 to associate or operate the second light 730b to illuminate the first visual indicator 720a of the stencil 704 or the first visual indicator 1504b of the stencil 1502, and associate or operate the first light 730a to illuminate the second visual indicator 720b of the stencil 704 or the second visual indicator 1504b of the stencil 1502 (block 2608). For example, the display output controller 2122 reverses the operation of the lights 730 when the stencil 704, 1502 does not trigger the stencil orientation sensor 2116 (e.g., the sensor 760).

Figure 27:
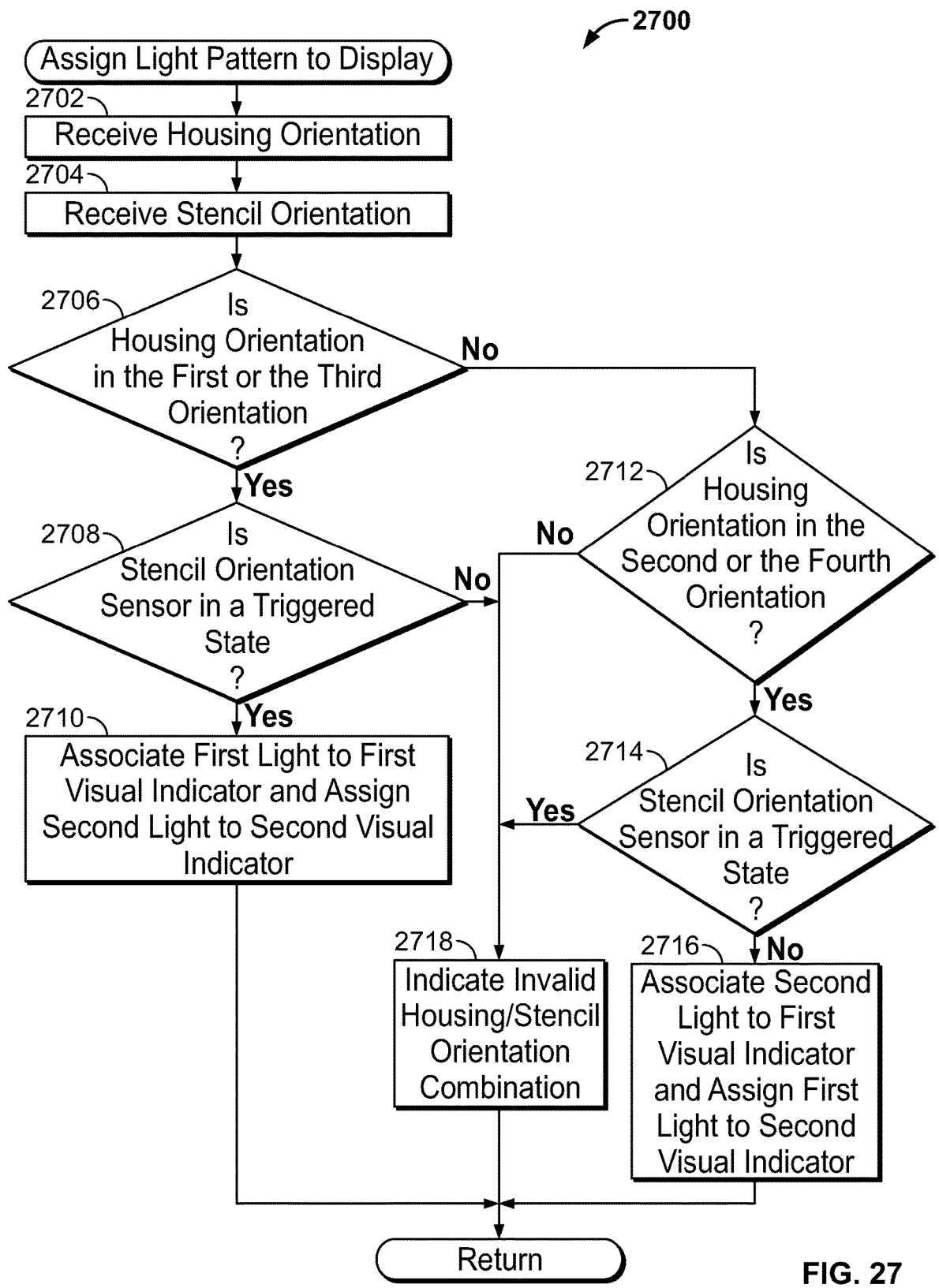

FIG. 27 is a flowchart representative of third example machine-readable instructions 2600 that may be executed by the meter 102, 500 of FIGS. 1-21 to control the lights 730 of the meter 102, 500 (e.g., block 2208 of FIG. 22) based on a detected housing orientation and a detected stencil direction. The program of FIG. 27 begins when the orientation validator 2118 receives the orientation of the housing 502 (block 2702) and the orientation of the stencil 704, 1502 (block 2704). In some examples, the orientation validator 2118 receives signals from the housing orientation sensor 2114 and the stencil orientation sensor 2116. In some examples, the orientation validator 2118 may determine the orientation of the housing 502 from block 2202 of FIG. 22 and the orientation of the stencil 704, 1502 from block 2208 of FIG. 22.

The orientation validator 2118 determines if the housing 502 is in the first orientation 902 or the third orientation 1506 (block 2706). For example, the orientation determiner 2118 may determine the orientation of the housing 502 based on the signals provided by the housing orientation sensor 2114 and/or the example program 2300 of FIG. 23.

If the orientation validator 2118 determines that the housing 502 is in the first orientation 902 or the third orientation 1506 at block 2706, the orientation validator 2118 determines if the stencil orientation sensor 2116 is in a triggered state (block 2708). For example, the stencil orientation sensor 2116 is in a triggered state when the second tab 764 of the stencil 704, 1502 is in the sensing chamber 800 and triggers the sensor 760.

If the orientation validator 2118 determines that the stencil orientation sensor 2116 is in a triggered state at block 2708, then the display output controller 2122 associates the first light 730a to the first visual indicator 720a of the stencil 704 or the first visual indicator 1504a of the stencil 1502, and associates the second light 730b to the second visual indicator 720b of the stencil 704 or the second visual indicator 1504b of the stencil 1502 (block 2710).

If the orientation validator 2118 determines that the housing 502 is not in the first orientation 902 or the third orientation 1506 at block 2706, the orientation validator 2118 determines if the housing 502 is in the second orientation 1102 or the fourth orientation 1702 (block 2712). If the orientation validator 2118 determines that the housing 502 is in the second orientation 1102 or the fourth orientation 1702 at block 2712, the orientation validator 2118 determines if the stencil orientation sensor 2116 is in a triggered state (block 2714).

If the orientation validator 2118 determines that the stencil orientation sensor 2116 is in a triggered state at block 2714, then the display output controller 2122 associates the second light 730b to the first visual indicator 720a of the stencil 704 or the first visual indicator 1504a of the stencil 1502, and associates the first light 730a to the second visual indicator 720b of the stencil 704 or the second visual indicator 1504b of the stencil 1502 (block 2716).

If housing orientation is not in the first orientation 902 or the third orientation 1506 at block 2706, the housing orientation is not in the second orientation 1102 or the fourth orientation 1702 at block 2712, the stencil orientation sensor is not in a triggered state at block 2708, or the stencil orientation sensor is in a triggered state at block 2714, then the program indicates that the orientation of the housing 502 and/or the orientation of the stencil 704, 1502 is invalid (block 2718).

Figure 28:
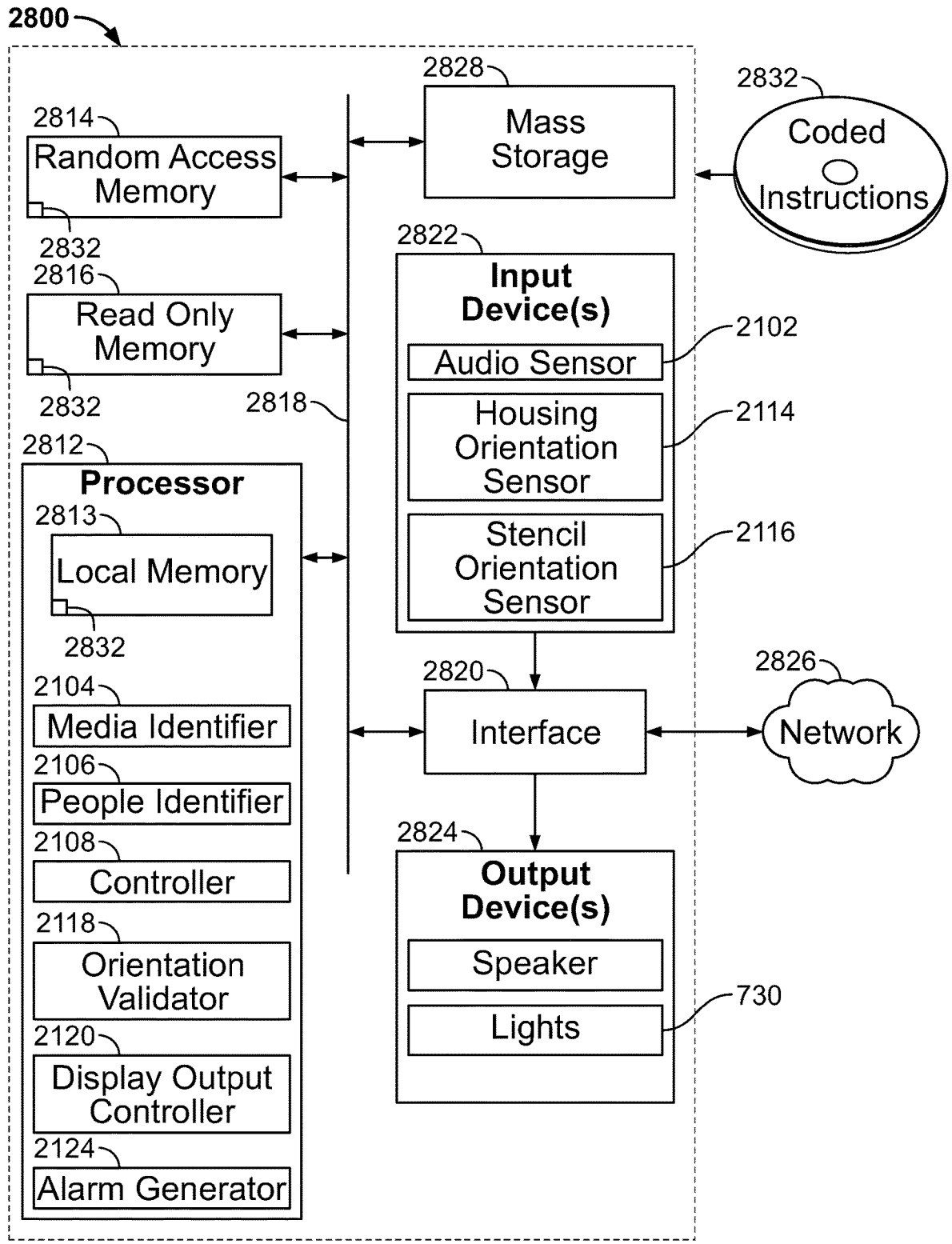
FIG. 28 is a block diagram of an example processor platform capable of executing the machine-readable instructions of FIGS. 22-27.

FIG. 28 is a block diagram of an example processor platform 2800 capable of executing the instructions of FIGS. 22-27 to implement the meter 102, 500 of FIGS. 1-21.

The processor platform 2800 of the illustrated example includes a processor 2812. The processor 1012 of the illustrated example is hardware. For example, the processor 2812 can be implemented by one or more integrated circuits, logic circuits, microprocessors or controllers from any desired family or manufacturer.

The processor 2812 of the illustrated example includes a local memory 2813 (e.g., a cache). The example processor 2812 executes instructions to implement the example audio sensor 2102, the example media identifier 2104, the example people identifier 2106, the example controller 2108, the example network communicator 2112, the example orientation validator 2118, the example comparator 2120, the example display output controller 2122, and the example alarm generator 2124.

The processor 2812 of the illustrated example is in communication with a main memory including a volatile memory 2814 and a non-volatile memory 2816 via a bus 2818. The volatile memory 2814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2816 may be implemented by flash memory and/or any other desired type of memory device. Access to the main memory 2814, 2816 is controlled by a memory controller.

The processor platform 2800 of the illustrated example also includes an interface circuit 2820. The interface circuit 2820 may be implemented by any type of interface standard, such as an Ethernet interface, a universal serial bus (USB), and/or a PCI express interface.

In the illustrated example, one or more input devices 2822 are connected to the interface circuit 2820. The input device(s) 2822 permit(s) a user to enter data and commands into the processor 1012. The input device(s) can be implemented by, for example, an audio sensor, a microphone, a camera (still or video), a sensor, and/or a voice recognition system. In the illustrated example of FIG. 28, the example input device(s) 2822 implement the example audio sensor 2102 (e.g., a microphone), the example housing orientation sensor 2114, and the example stencil orientation sensor 2116.

One or more output devices 2824 are also connected to the interface circuit 2820 of the illustrated example. The output devices 1024 can be implemented, for example, by display devices (e.g., a light emitting diode (LED) such as, for example, the lights 730), an organic light emitting diode (OLED), a tactile output device, a printer and/or speakers). The interface circuit 2820 of the illustrated example, thus, typically includes a graphics driver card, a graphics driver chip or a graphics driver processor.

The interface circuit 2820 of the illustrated example also includes a communication device such as a transmitter, a receiver, a transceiver, a modem and/or network interface card to facilitate exchange of data with external machines (e.g., computing devices of any kind) via a network 2826 (e.g., an Ethernet connection, a digital subscriber line (DSL), a telephone line, coaxial cable, a cellular telephone system, etc.).

The processor platform 2800 of the illustrated example also includes one or more mass storage devices 2828 for storing software and/or data. Examples of such mass storage devices 2828 include floppy disk drives, hard drive disks, compact disk drives, Blu-ray disk drives, RAID systems, and digital versatile disk (DVD) drives.

The coded instructions 2832 of FIGS. 22-27 may be stored in the mass storage device 2828, in the volatile memory 2814, in the non-volatile memory 2816, and/or on a removable tangible computer readable storage medium such as a CD or DVD. In the illustrated example of FIG. 28 the example mass storage device 2828 stores the data store 2110. However, any other memory device of the example processor platform 2800 may additionally or alternatively store the example data store 2110.

At least some of the aforementioned examples include one or more features and/or benefits including, but not limited to, the following:

In some examples, an apparatus includes a housing orientation sensor to provide a first signal representative of an orientation of a housing of a meter. In some such examples, the apparatus includes a stencil orientation sensor to provide a second signal representative of an orientation of a stencil of the meter. In some such examples, an orientation validator receives the first and second signals. In some such examples, the orientation validator determines, based on the first signal and the second signal, whether an orientation of the stencil relative to an orientation of the housing is valid.

In some examples, the housing orientation sensor includes an accelerometer.

In some examples, the stencil orientation sensor includes a contact switch.

In some examples, the orientation validator is to determine the orientation of the housing to be at least one of a first orientation, a second orientation, a third orientation, or a fourth orientation based on the first signal.

In some examples, an alarm generator to generate an alarm when the orientation validator determines that the orientation of the housing is not the first orientation, the second orientation, the third orientation or the fourth orientation.

In some examples, the orientation validator is to determine that the stencil is in at least one of a first direction or a second direction, based on the second signal.

In some examples, the stencil presents a plurality of visual indicators in an upright orientation when the stencil is in the first direction and the stencil presents the visual indicators in an upside-down orientation when the stencil is in the second direction.

In some examples, the orientation validator is to determine the orientation of the stencil relative to the orientation of the housing is valid when the stencil is determined to be in the first direction and the housing is determined to be in at least one of the first orientation, the second orientation, the third orientation or the fourth orientation.

In some examples, an alarm generator to generate an alarm when the orientation validator determines the stencil is in the second direction and the orientation of the housing is the first orientation, the second orientation, the third orientation or the fourth orientation.

In some examples, a display output controller controls operation of a plurality of lights of the meter based on at least one of the orientation of the housing or the orientation of the stencil.

In some examples, the display output controller is to illuminate a first light to display a first visual indicator of the stencil and illuminate a second light to display a second visual indicator of the stencil when the orientation validator determines the orientation of the housing is in the first orientation or the third orientation.

In some examples, the display output controller is to illuminate the second light to display the first visual indicator of the stencil and illuminate the first light to display the second visual indicator of the stencil when the orientation validator determines the orientation of the housing is in the second orientation or the fourth orientation.

In some examples, the display output controller is to illuminate a first light to display a first visual indicator of the stencil and illuminate a second light to display a second visual indicator of the stencil when the orientation validator determines the stencil orientation sensor is in a triggered state.

In some examples, the display output controller is to illuminate the second light to display the first visual indicator of the stencil and illuminate the first light to display the second visual indicator of the stencil when the orientation validator determines the stencil orientation sensor is in a non-triggered state.

In some examples, a method includes determining, by executing an instruction with a processor, an orientation of a housing of a meter. In some such examples, the method includes determining, by executing an instruction with a processor, an orientation of a stencil. In some such examples, the method includes determining, by executing an instruction with a processor, whether the orientation of the stencil relative to the orientation of the housing is valid.

In some examples, determining whether the orientation of the stencil relative to the orientation of the housing is valid includes comparing the orientation of the housing and the orientation of the stencil.

In some examples the determining of the orientation of the housing includes detecting if the housing is in at least one of a first orientation or a second orientation, the first orientation being different than the second orientation.

In some examples, the detecting of the orientation of the housing includes sensing a rotation of the housing from the first orientation to the second orientation while the stencil is positioned in a display area of the housing.

In some examples, the determining of the orientation of the housing further includes detecting if the housing is in at least one of a third orientation or a fourth orientation, the third orientation being different than the fourth orientation.

In some examples, the method includes receiving a signal from a sensor to determine if the housing is in at least one of the first orientation, the second orientation, the third orientation or the fourth orientation.

In some examples, the method includes generating an alarm when the housing is not in the first orientation, the second orientation, the third orientation or the fourth orientation.

In some examples, the method includes the determining of the orientation of the stencil includes determining if the stencil is in at least one of a first direction or a second direction.

In some examples, the method includes receiving a signal from a sensor to determine the orientation of the stencil.

In some examples, the method includes determining that a visual indicator of the stencil is in an upright orientation relative to the orientation of the housing when the stencil is in the first direction and determining that the visual indicator of the stencil is in an upside-down orientation when the stencil is in the second direction relative to the determined orientation of the housing.

In some examples, the method includes generating an alarm when the stencil is in the second direction and the housing is in at least one of the first orientation, the second orientation, the third orientation, or the fourth orientation.

In some examples, the method includes controlling operation of a plurality of lights based on at least one of the orientation of the housing or the orientation of the stencil.

In some examples, the controlling of the operation of the lights includes illuminating a first light to display a first visual indicator of the stencil and illuminating a second light to display a second visual indicator of the stencil when the housing is in the first orientation or the third orientation.

In some examples, the controlling of the operation of the lights includes illuminating the second light to display the first visual indicator of the stencil and illuminating the first light to display the second visual indicator of the stencil when the housing is in the second orientation or the fourth orientation.

In some examples, the controlling of the operation of the lights includes illuminating a first light to display a first visual indicator of the stencil and illuminating a second light to display a second visual indicator of the stencil when the stencil triggers a stencil orientation sensor.

In some examples, the controlling of the operation of the lights includes illuminating the second light to display the first visual indicator of the stencil and illuminating the first light to display the second visual indicator of the stencil when the stencil does not triggers a stencil orientation sensor.

In some examples, a tangible computer-readable medium comprising instructions that, when executed, cause a machine to: determine, via execution of an instruction with a processor, an orientation of a housing of a meter; determine, via execution of an instruction with a processor, an orientation of a stencil; and determine, via execution of an instruction with a processor, whether the orientation of the stencil relative to the orientation of the housing is valid.

In some examples, the instructions, when executed, cause the machine to compare the orientation of the housing and the orientation of the stencil to determine whether the orientation of the stencil relative to the orientation of the housing is valid.

In some examples, the instructions, when executed, cause the machine to detect whether the housing is in at least one of a first orientation or a second orientation, where the first orientation is different than the second orientation.

In some examples, the instructions, when executed, cause the machine to sense a rotation of the housing from the first orientation to the second orientation while the stencil is positioned in a display area of the housing to detect the orientation of the housing.

In some examples, the instructions, when executed, cause the machine to detect whether the housing is in at least one of a third orientation or a fourth orientation, the third orientation being different than the fourth orientation.

In some examples, the instructions, when executed, cause the machine to receive a signal from a first sensor and to determine if the housing is in at least one of the first orientation, the second orientation, the third orientation or the fourth orientation.

In some examples, the instructions, when executed, cause the machine to generate an alarm when the housing is not in the first orientation, the second orientation, the third orientation or the fourth orientation.

In some examples, the instructions, when executed, cause the machine to determine whether the stencil is in at least one of a first direction or a second direction.

In some examples, the instructions, when executed, cause the machine to receive a signal from a sensor to determine the orientation of the stencil.

In some examples, the instructions, when executed, cause the machine to determine that a visual indicator of the stencil is in an upright orientation relative to the orientation of the housing when the stencil is in the first direction and determine that the visual indicator of the stencil is in an upside-down orientation when the stencil is in the second direction.

In some examples, the instructions, when executed, cause the machine to generate an alarm when the stencil is in the second direction and the housing is in at least one of the first orientation, the second orientation, the third orientation or the fourth orientation.

In some examples, the instructions, when executed, cause the machine to control operation of a plurality of lights based on at least one of the orientation of the housing or the orientation of the stencil.

In some examples, the instructions, when executed, cause the machine to illuminate a first light to display a first visual indicator of the stencil and illuminate a second light to display a second visual indicator of the stencil when the housing is in the first orientation or the third orientation.

In some examples, the instructions, when executed, cause the machine to illuminate the second light to display the first visual indicator of the stencil and illuminate the first light to display the second visual indicator of the stencil when the housing is in the second orientation or the fourth orientation.

In some examples, the instructions, when executed, cause the machine to illuminate a first light to display a first visual indicator of the stencil and illuminate a second light to display a second visual indicator of the stencil when a stencil orientation sensor is in a triggered state.

In some examples, the instructions, when executed, cause the machine to illuminate the second light to display the first visual indicator of the stencil and illuminate the first light to display the second visual indicator of the stencil when a stencil orientation sensor is in a non-triggered state.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. An apparatus comprising:
at least one processor; and
memory including instructions that, when executed, cause the at least one processor to at least:
determine an orientation of a housing;
determine if a housing is in a mounting orientation;
in response to determining that the housing is not in the mounting orientation, initiate a first alarm;
in response to determining that the housing is in the mounting orientation, determine an orientation of a stencil;
determine if the stencil is in an upright orientation; and
in response to determining that stencil is not in the upright orientation, initiate a second alarm; and
in response to at least one of the housing being in the mounting orientation or the stencil being in the upright orientation, assign a light pattern to a plurality of lights associated with the stencil.

2. The apparatus as defined in claim 1, wherein the at least one processor determines the orientation of the housing based on a first signal received from a housing orientation sensor, and wherein at least one processor determines the that the housing is in the mounting orientation when the first signal is indicative of the housing being in at least one of a first housing orientation, a second housing orientation, a third housing orientation, or a fourth housing orientation.

3. The apparatus as defined in claim 2, wherein in response to the at least one processor determining the housing in the first orientation or the third orientation, the at least one processor is to assign a first light to a first visual indicator of the stencil and assign a second light to a second visual indicator of the stencil, and wherein in response to determining the housing in the second orientation or the fourth orientation, the at least one processor is to assign the first light to the second visual indicator of the stencil and assign the second light to the first visual indicator of the stencil.

4. The apparatus as defined in claim 2, wherein the at least one processor is to determine the orientation of the stencil based on a second signal received from a stencil orientation sensor.

5. The apparatus as defined in claim 4, wherein the at least one processor determines the stencil is in the upright orientation when the second signal received from the stencil orientation sensor is indicative of: (1) the stencil being in a first direction or the third direction when the at least one processor determines the housing is in one of the first orientation or the third orientation, or (2) the stencil being in the second direction or the fourth direction when the at least one processor determines the housing is in one of the second orientation or the fourth orientation.

6. The apparatus as defined in claim 5, wherein in response to determining the orientation of the housing in the first orientation or the third orientation based on the first signal and the stencil being in the first direction or the third direction, the at least one processor is to assign a first light to a first visual indicator of the stencil and assign a second light to a second visual indicator of the stencil, and in response to determining the orientation of the housing in the second orientation or the fourth orientation based on the first signal and the stencil being in the second direction or the fourth direction, the at least one processor is to assign the first light to the second visual indicator of the stencil and assign the second light to the first visual indicator of the stencil.

7. The apparatus as defined in claim 1, wherein the at least one processor is to determine the orientation of the stencil based on a first signal received from a stencil orientation sensor.

8. The apparatus as defined in claim 7, wherein the at least one processor assigns the light pattern by:
assigning a first light to display a first visual indicator of the stencil and illuminating a second light to display a second visual indicator of the stencil when the second signal is indicative of the stencil orientation sensor being in a triggered state; and
assigning the second light to display the first visual indicator of the stencil and illuminating the first light to display the second visual indicator of the stencil when the second signal is indicative of the stencil orientation sensor being in a non-triggered state.

9. A non-transitory computer readable medium comprising instructions that, when executed, cause at least one processor to at least:
determine an orientation of a housing;
determine if a housing is in a mounting orientation;
in response to determining that the housing is not in the mounting orientation, initiate a first alarm;
in response to determining that the housing is in the mounting orientation, determine an orientation of a stencil;
determine if the stencil is in an upright orientation;
in response to determining that stencil is not in the upright orientation, initiate a second alarm; and
in response to at least one of the housing being in the mounting orientation or the stencil being in the upright orientation, assign a light pattern to a plurality of lights associated with the stencil.

10. The non-transitory computer readable medium as defined in claim 9, wherein the instructions are further to cause the at least one processor to, determine the orientation of the housing based on a first signal received from a housing orientation sensor, and determine the that the housing is in the mounting orientation when the first signal is indicative of the housing being in at least one of a first housing orientation, a second housing orientation, a third housing orientation, or a fourth housing orientation.

11. The non-transitory computer readable medium as defined in claim 10, wherein the instructions are further to cause the at least one processor to, assign a first light to a first visual indicator of the stencil and assign a second light to a second visual indicator of the stencil in response to the at least one processor determining the housing in the first orientation or the third orientation, and assign the first light to the second visual indicator of the stencil and assign the second light to the first visual indicator of the stencil in response to determining the housing in the second orientation or the fourth orientation.

12. The non-transitory computer readable medium as defined in claim 10, wherein the instructions are further to cause the at least one processor to, determine the orientation of the stencil based on a second signal received from a stencil orientation sensor.

13. The non-transitory computer readable medium as defined in claim 12, wherein the instructions are further to cause the at least one processor to, determine the stencil is in the upright orientation when the second signal received from the stencil orientation sensor is indicative of: (1) the stencil being in a first direction or the third direction when the at least one processor determines the housing is in one of the first orientation or the third orientation, or (2) the stencil being in the second direction or the fourth direction when the at least one processor determines the housing is in one of the second orientation or the fourth orientation.

14. The non-transitory computer readable medium as defined in claim 13, wherein the instructions are further to cause the at least one processor to, assign a first light to a first visual indicator of the stencil and assign a second light to a second visual indicator of the stencil in response to determining the orientation of the housing in the first orientation or the third orientation based on the first signal and the stencil being in the first direction or the third direction, and assign the first light to the second visual indicator of the stencil and assign the second light to the first visual indicator of the stencil in response to determining the orientation of the housing in the second orientation or the fourth orientation based on the first signal and the stencil being in the second direction or the fourth direction.

15. The non-transitory computer readable medium as defined in claim 9, wherein the instructions are further to cause the at least one processor to, determine the orientation of the stencil based on a first signal received from a stencil orientation sensor.

16. The non-transitory computer readable medium as defined in claim 15, wherein the instructions are further to cause the at least one processor to:
assign a first light to display a first visual indicator of the stencil and illuminating a second light to display a second visual indicator of the stencil when the second signal is indicative of the stencil orientation sensor being in a triggered state; and
assign the second light to display the first visual indicator of the stencil and illuminating the first light to display the second visual indicator of the stencil when the second signal is indicative of the stencil orientation sensor being in a non-triggered state.

17. A method comprising:
determining, by executing an instruction with at least one processor, an orientation of a housing;
determining, by executing an instruction with the at least one processor, if a housing is in a mounting orientation;
in response to determining that the housing is not in the mounting orientation, initiating, by executing an instruction with the at least one processor, a first alarm;
in response to determining that the housing is in the mounting orientation, determining, by executing an instruction with the at least one processor, an orientation of a stencil;
determining, by executing an instruction with the at least one processor, if the stencil is in an upright orientation;
in response to determining that stencil is not in the upright orientation, initiating, by executing an instruction with the at least one processor, a second alarm; and
in response to at least one of the housing being in the mounting orientation or the stencil being in the upright orientation, assigning, by executing an instruction with the at least one processor, a light pattern to a plurality of lights associated with the stencil.

18. The method as defined in claim 17, further including receiving a first signal from a housing orientation sensor to determine the orientation of the housing, and wherein the determining of the housing being in the mounting orientation includes receiving the first signal indicative of the housing being in at least one of a first housing orientation, a second housing orientation, a third housing orientation, or a fourth housing orientation.

19. The method as defined in claim 18, wherein assigning the light pattern includes assigning a first light to a first visual indicator of the stencil and assigning a second light to a second visual indicator of the stencil in response to determining the housing being in the first orientation or the third orientation, and assigning the first light to the second visual indicator of the stencil and assign the second light to the first visual indicator of the stencil in response to determining the housing being in the second orientation or the fourth orientation.

20. The method as defined in claim 18, further including receiving a second signal from a stencil orientation sensor to determine the stencil being in the upright orientation.

21. The method as defined in claim 20, wherein the determining of the stencil being in the upright orientation includes receiving the second signal from the stencil orientation sensor indicative of: (1) the stencil being in a first direction or the third direction in response to determining the housing being in one of the first orientation or the third orientation, or (2) the stencil being in the second direction or the fourth direction in response to determining the housing being in one of the second orientation or the fourth orientation.

22. The method as defined in claim 21, wherein the assigning of the light pattern includes assigning a first light to a first visual indicator of the stencil and assign a second light to a second visual indicator of the stencil in response to determining the orientation of the housing in the first orientation or the third orientation based on the first signal and the stencil being in the first direction or the third direction, and assigning the first light to the second visual indicator of the stencil and assign the second light to the first visual indicator of the stencil in response to determining the orientation of the housing in the second orientation or the fourth orientation based on the first signal and the stencil being in the second direction or the fourth direction.

23. The method as defined in claim 17, further including receiving a first signal from a stencil orientation sensor to determine the orientation of the stencil.

24. The method as defined in claim 23, wherein the assigning the light pattern includes:
assigning a first light to display a first visual indicator of the stencil and illuminating a second light to display a second visual indicator of the stencil when the second signal is indicative of the stencil orientation sensor being in a triggered state; and
assigning the second light to display the first visual indicator of the stencil and illuminating the first light to display the second visual indicator of the stencil when the second signal is indicative of the stencil orientation sensor being in a non-triggered state.

\* \* \* \* \*